United States Patent
Kobayashi

(10) Patent No.: US 8,170,963 B2
(45) Date of Patent: May 1, 2012

(54) APPARATUS AND METHOD FOR PROCESSING INFORMATION, RECORDING MEDIUM AND COMPUTER PROGRAM

(75) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 762 days.

(21) Appl. No.: 12/186,448

(22) Filed: Aug. 5, 2008

(65) Prior Publication Data

US 2009/0048991 A1 Feb. 19, 2009

(30) Foreign Application Priority Data

Aug. 14, 2007 (JP) ................. P2007-211477

(51) Int. Cl.
*G06N 3/12* (2006.01)
*G06N 3/00* (2006.01)
*G06F 15/18* (2006.01)

(52) U.S. Cl. ........................................ 706/13
(58) Field of Classification Search .............. 706/13
See application file for complete search history.

(56) References Cited

U.S. PATENT DOCUMENTS 5,924,048 A * 7/1999 McCormack et al. .......... 702/13

FOREIGN PATENT DOCUMENTS

| EP | 1 843 323 A1 | 10/2007 |
|----|----|----|
| JP | 2000-20504 | 1/2000 |
| JP | 2004-355174 | 12/2004 |
| JP | 2007-121457 | 5/2007 |
| WO | WO 2007/049641 | 5/2007 |
| WO | WO 2007/049641 A1 | 5/2007 |

OTHER PUBLICATIONS

Pachet, Francois and Aymeric Zils. "Evolving Automatically High-Level Music Descriptors from Acoustic Signals" pringer-Verlag. 2004. [ONLINE] Downloaded Apr. 13, 2011. http://www.springerlink.com/content/v0etb7gpm0e6veuk/fulltext.pdf.*

(Continued)

*Primary Examiner* — Kakali Chaki
*Assistant Examiner* — Ben Rifkin
(74) *Attorney, Agent, or Firm* — Finnegan, Henderson, Farabow, Garrett & Dunner, L.L.P.

(57) ABSTRACT

An information processing apparatus includes a target problem acquisition unit for acquiring a target problem, a generation unit for generating a plurality of solution candidates to the target problem to solve the target problem, and a contribution ratio calculating unit for calculating a contribution ratio of each solution candidate to the target problem if the target problem is solved using all the plurality of solution candidates to the target problem acquired by the target problem acquisition unit. The generation unit generates a solution candidate to the target problem in a next generation in accordance with a genetic algorithm that uses an evaluation value that is calculated using at least the contribution ratio of each solution candidate to the target problem determined by the contribution ratio calculating unit.

16 Claims, 28 Drawing Sheets

OTHER PUBLICATIONS

Lopez-Pujalte, Cristina and Vicente P. Guerrero-Bote. "Order-Based Fitness Functions for Genetic Algorithms Applied to Relevance Feedback" Journal of the American Society for Information Science and Technology. 2003. [ONLINE] Downloaded Apr. 13, 2011. http://www.scimago.es/publications/jasist-03.pdf.*

Y.Kobayashi, "Automatic Generation of Musical Instrument Detector by Using Evolutionary Learning Method," 10th International Society for Music Information Retrieval Conference (ISMIR2009), pp. 93-98, (2009).

A. Zils, Le Systeme Eds . XP007912802, Extraction De Descripteurs Musicaux: Une Approche Evolutionniste, Chapter 4. Universite Pierre et Marie Curie, pp. 33-75 and Table of Contents, (2004).

H. Vafaie, "Using Genetic Algorithms for Restructing Feature-based Representation Spaces" George Mason University , XP007912828, Chapter 7, Summary and Conclusions, pp. 153-160 (1997).

M. Smith et al."Genetic Programming with a Genetic Algorithm for Feature Construction and Selection", Genetic Programming and Evolvable Machines, 6:3, pp. 265-281, (2005).

European Search Report from the European Patent Office in European Application No. 08252482.8, May 6, 2010.

Japanese Office Action in corresponding Japanese Patent Application 2007-211477 dated Jul. 2, 2009 (2 pages).

* cited by examiner

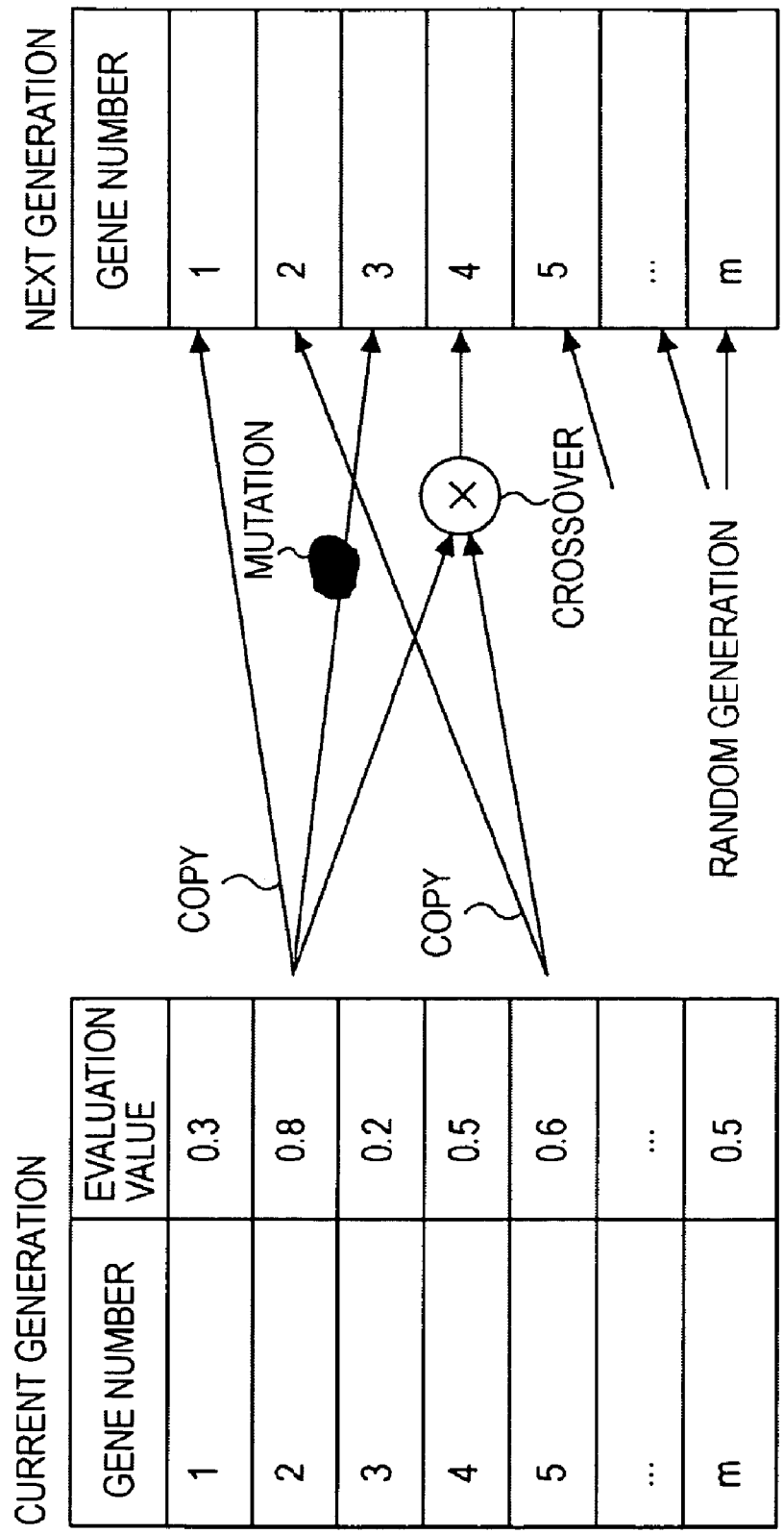

| GENE LIST NUMBER | EVALUATION VALUE |
|---|---|
| 1 | 0.3 |
| 2 | 0.8 |
| 3 | 0.2 |
| 4 | 0.5 |
| 5 | 0.6 |
| ... | ... |
| m | 0.5 |

GENE LIST 1
GENE LIST 2
GENE LIST m
GENE 1
GENE 2
GENE 3
...
GENE n

US 8,170,963 B2

APPARATUS AND METHOD FOR PROCESSING INFORMATION, RECORDING MEDIUM AND COMPUTER PROGRAM

CROSS REFERENCES TO RELATED APPLICATIONS

The present invention contains subject matter related to Japanese Patent Application JP 2007-211477 filed in the Japanese Patent Office on Aug. 14, 2007, the entire contents of which are incorporated herein by reference.

BACKGROUND OF THE INVENTION

1. Field of the Invention

The present invention relates to an information processing apparatus, an information processing method, a recording medium and a computer program and, in particular, to an information processing apparatus, an information processing method, a recording medium and a computer program, for use in determining as a solution a set of genes appropriate for solving a target problem.

2. Description of the Related Art

Genetic search algorithm is used as one of algorithms for determining an approximate solution to a given problem.

In accordance with the genetic search algorithm in the related art, data (solution candidate) is represented as a gene, a plurality of genes are prepared, and an evaluation value of each gene is then calculated. A gene having a higher evaluation value is selected in a next generation with a higher priority, and used as a seed for crossover or mutation operations. With generations in progress, a solution is searched.

The genetic search method in the related art is described below with reference to FIG. 1.

Two sets, each containing genes, namely, solution candidates of a predetermined number m, are prepared. The two sets are referred to as a "current generation" and a "next generation." In a first generation as the current generation, m genes are randomly generated. Through an evaluation function, the evaluation value of each gene in the current generation is calculated.

After the m genes in the current generation are given respectively evaluation values, crossover, mutation and copy operations are performed based on the evaluation values. New genes are also generated randomly. The results are then stored as m genes in the next generation. The crossover, mutation, and copy operations and the random generation of a new gene are performed at predetermined rate.

The crossover operation is modeled from living creatures that produce offspring by mating. In the crossover operation, two genes in the current generation are selected, and a gene in a next generation is generated with part of the gene in the current generation exchanged. A plurality of methods are available in the crossover operation by selecting crossover points, namely, one crossover point, two crossover points, or multiple crossover points. The mutation operation is modeled from mutation of genes observed in living creatures. One gene is selected from the current generation and part of the selected gene is changed. In the copy operation, one gene is selected from the current generation, and the selected gene is directly stored as a gene for the next generation.

When any of the crossover, mutation and copy operations is performed, a gene selection process of the current generation is performed. The gene selection is performed using an algorithm that allows a gene having a higher evaluation value to be selected with a higher priority, based on the evaluation values of the genes of the current generation. A plurality of algorithms for the gene selection have been proposed, including ranking selection, tournament selection, elite selection, etc.

An example of FIG. 1 is described. A gene number 2 having an evaluation value 0.8 and a gene number 5 having an evaluation value 0.6 are selected and copied to a next generation as having a higher evaluation value with higher priority. The gene number 2 having an evaluation value 0.8 is selected and mutated as having a high evaluation value with higher priority, and a gene generated through mutation is stored for the next generation. From among the genes in the current generation, the gene number 2 having an evaluation value 0.8 and the gene number 5 having an evaluation value 0.6 are selected and crossed over, and a gene generated through the crossover operation is stored for the next generation. Genes are randomly generated at a predetermined rate, and stored for the next generation.

With the genes for the next generation prepared, the gene group of those genes is treated as genes in the current generation and the evaluation values of the genes in the current generation are calculated. The crossover, the mutation and the copy operations are performed based on the evaluation values, and new genes are then generated randomly. Results are then stored as m genes for a next generation. If a gene reaches the highest evaluation value that can be exceeded no longer, or if a predetermined number of generations has passed, a gene having the highest evaluation value in the current generation is output as a "solution."

For example, the generation search method is applied to generate an algorithm that allows a feature quantity to be selected at a high accuracy level at a high speed from content data such as music data as disclosed in International Publication No. WO2007/049641.

The genetic search method used in International Publication No. WO2007/049641 is described with reference to FIGS. 2A and 2B.

The genetic search method of the related art described with reference to FIG. 1 outputs one gene as a solution appropriate for solving a target problem. In contrast, the genetic search method disclosed in International Publication No. WO2007/049641 outputs a set of genes appropriate for solving a target problem.

The genetic search method disclosed in International Publication No. WO2007/049641 is intended to determine "a gene group composed a plurality of genes" that allow an approximate solution to the target problem to be accurately determined instead of a "single gene" that allows an approximate solution to the target problem to be accurately determined. In order to generate the gene group solving the target problem, a plurality of gene lists, each listing a plurality of genes, are used. Let m represent the number of gene lists and n represent the number of genes listed in a single gene list.

The evaluation values are calculated on a per gene list basis instead of on a per gene basis. A gene list is selected from the gene lists of the current generation based on the evaluation values provided on a per gene list basis. The copy, crossover and mutation operations and the random generation of the new gene list are performed to generate m gene lists of a new generation.

SUMMARY OF THE INVENTION

The genetic search method in the related art, intended to search for one excellent gene, is not applicable if the target problem is solved with a plurality of genes working in cooperation with each other.

In the technique disclosed in International Publication No. WO2007/049641, a target problem is solved using a plurality of genes rather than using a single gene. In such a case, a plurality of gene lists is stored, a gene list is selected-based on the evaluation values provided to each gene list, and next generation genes are generated. A set of genes for solving the target problem, namely, a gene list is output as a solution. In this way, an algorithm thus generated extracts a feature quantity at high accuracy level at a high speed based on a large number of factors.

In accordance with the technique disclosed in International Publication No. WO2007/049641, the number of genes is n×m and an amount of calculation is increased by n times the case in which the number of genes is m. Optimizing the disclosed algorithm requires an extremely high throughput and a long process time.

It is thus desirable to determine the set of genes appropriate for solving the target problem with a small amount of calculation.

In accordance with one embodiment of the present invention, an information processing apparatus includes target problem acquisition means for acquiring a target problem, generation means for generating a plurality of solution candidates to the target problem to solve the target problem, and contribution ratio calculating means for calculating a contribution ratio of each solution candidate to the target problem if the target problem is solved using all the plurality of solution candidates to the target problem acquired by the target problem acquisition means. The generation means generates the solution candidate to the target problem in a next generation in accordance with a genetic algorithm that uses an evaluation value that is calculated using at least the contribution ratio of each solution candidate to the target problem calculated by the contribution ratio calculating means.

The target problem acquisition means may include first acquisition means for acquiring learning data, and second acquisition means for acquiring as supervisor data a solution to the target problem corresponding to the learning data, wherein the target problem acquisition means sets the target problem as the finding of means for determining from the learning data the solution corresponding to the learning data.

The generation means may include list generation means for generating a list containing a plurality of data calculation equations. The contribution ratio calculating means may include calculation means for performing a calculation operation on the learning data, acquired by the first acquisition means, using the plurality of data calculation equations contained in the list generated by the list generation means, and contribution ratio acquisition means for learning a feature quantity calculation equation using the calculation results of the calculation means, and for determining a contribution ratio of each data calculation equation in the feature quantity calculation equation obtained as a result of learning, the feature quantity calculation equation being used to estimate the supervisor data acquired by the second acquisition means and being a linear combination of output values of the plurality of data calculation equations contained in the list generated by the list generation means. The list generation means generates randomly the data calculation equations contained in the list of a first generation, and generates the list of next generations including a second generation in accordance with a genetic algorithm, the genetic algorithm using an evaluation value calculated from the contribution ratio of each data calculation equation determined by the contribution ratio acquisition means with each data calculation equation contained in the list of a current generation serving as a gene.

The information processing apparatus may further include output means for outputting the feature quantity calculation equation learned by the contribution ratio acquisition means and the list of the final generation generated by the list generation means.

The output means may output the feature quantity calculation equation learned by the contribution ratio acquisition means and the list of the final generation generated by the list generation means if the calculation results of the feature quantity calculation equation learned by the contribution acquisition means reach a predetermined accuracy with respect to the supervisor data acquired by the second acquisition means.

The contribution ratio acquisition means may estimate the supervisor data using the feature quantity calculation equation based on a linear combination coefficient with a gene indicating in the feature quantity calculation equation whether the linear combination coefficient of the data calculation equation is zero or not, and learn the feature quantity calculation equation in accordance with the genetic algorithm using the evaluation value that evaluates the estimation results with an evaluation function.

The information processing apparatus may further include third acquisition means for acquiring detection data, and feature quantity arithmetic means for calculating a feature quantity of the detection data by processing the detection data, acquired by the third acquisition means, using the feature quantity calculation equation learned by the contribution ratio acquisition means, and the list of the final generation generated by the list generation means.

In accordance with one embodiment of the present invention, an information processing method of an information processing apparatus for determining a solution to a target problem, includes steps of acquiring the target problem, generating a plurality of solution candidates to the target problem to solve the target problem, and calculating a contribution ratio of each solution candidate to the target problem if the target problem is solved using all the plurality of solution candidates to the target problem. The generating includes generating the solution candidate to the target problem in a next generation in accordance with a genetic algorithm that uses an evaluation value that is calculated using at least the calculated contribution ratio of each solution candidate to the target problem.

In accordance with one embodiment of the present invention, a program for causing a computer to determine a solution to a target problem, includes steps of acquiring the target problem, generating a plurality of solution candidates to the target problem to solve the target problem, and calculating a contribution ratio of each solution candidate to the target problem if the target problem is solved using all the plurality of solution candidates to the target problem. The generating may include generating the solution candidate to the target problem in a next generation in accordance with a genetic algorithm that uses an evaluation value that is calculated using at least the calculated contribution ratio of each solution candidate to the target problem.

In accordance with embodiments of the present invention, the target problem is acquired. The plurality of solution candidates to the target problem are generated to solve the target problem. The contribution ratio of the solution candidate to the target problem is determined if the target problem is solved using all the plurality of solution candidates to the target problem. A solution candidate to the target problem in the next generation is generated in accordance with the genetic algorithm using the evaluation value that is calculated using at least the contribution ratio of each solution candidate to the target problem.

In accordance with one embodiment of the present invention, an information processing apparatus includes first acquisition means for acquiring detection data, second acquisition means for acquiring a feature quantity extraction algorithm, and feature quantity calculating means for calculating a feature quantity of the detection data by processing the detection data, acquired by the first acquisition means, in accordance with the feature quantity extraction algorithm acquired by the second acquisition means. The feature quantity extraction algorithm acquired by the second acquisition means includes a feature quantity calculation equation and a list of the final generation. The feature quantity calculation equation and the list of the final generation result from generating a list of a first generation containing a plurality data calculation equations by generating randomly the data calculation equations contained in the list, processing predetermined learning data using the plurality of data calculation equations forming the generated list, learning the feature quantity calculation equation that is a linear combination of the plurality of data calculation equations forming the list, using the process results of the predetermined learning data, the feature quantity calculation equation being used to estimate predetermined supervisor data, determining a contribution ratio of each data calculation equation in the feature quantity calculation equation resulting from the learning, and generating the list of a second generation or a later generation in accordance with a genetic algorithm, the genetic algorithm using an evaluation value calculated from at least the contribution ratio of each data calculation equation with each data calculation equation contained in the list of the current generation serving as a gene.

In accordance with one embodiment of the present invention, an information processing method of an information processing apparatus for calculating a feature quantity of detection data based on an algorithm for determining a solution to a target problem, includes steps of acquiring the detection data, acquiring a feature quantity extraction algorithm, and calculating a feature quantity of the detection data by processing the detection data in accordance with the feature quantity extraction algorithm. The feature quantity extraction algorithm includes a feature quantity calculation equation and a list of the final generation. The feature quantity calculation equation and the list of the final generation result from generating a list of a first generation containing a plurality data calculation equations by generating randomly the data calculation equations contained in the list, processing predetermined learning data using the plurality of data calculation equations forming the generated list, learning the feature quantity calculation equation that is a linear combination of the plurality of data calculation equations forming the list, using the process results of the predetermined learning data, the feature quantity calculation equation being used to estimate predetermined supervisor data, determining a contribution ratio of each data calculation equation in the feature quantity calculation equation resulting from the learning, and generating the list of a second generation or a later generation in accordance with a genetic algorithm, the genetic algorithm using an evaluation value calculated from at least the contribution ratio of each data calculation equation with each data calculation equation contained in the list of the current generation serving as a gene.

In accordance with one embodiment of the present invention, a computer program for causing a computer to calculate a feature quantity of detection data based on an algorithm for determining a solution to a target problem, includes steps of acquiring the detection data, acquiring a feature quantity extraction algorithm, and calculating a feature quantity of the detection data by processing the detection data in accordance with the feature quantity extraction algorithm. The feature quantity extraction algorithm includes a feature quantity calculation equation and a list of the final generation. The feature quantity calculation equation and the list of the final generation result from generating a list of a first generation containing a plurality data calculation equations by generating randomly the data calculation equations contained in the list, processing predetermined learning data using the plurality of data calculation equations forming the generated list, learning the feature quantity calculation equation that is a linear combination of the plurality of data calculation equations forming the list, using the process results of the predetermined learning data, the feature quantity calculation equation being used to estimate predetermined supervisor data, determining a contribution ratio of each data calculation equation in the feature quantity calculation equation resulting from the learning, and generating the list of a second generation or a later generation in accordance with a genetic algorithm, the genetic algorithm using an evaluation value calculated from at least the contribution ratio of each data calculation equation with each data calculation equation contained in the list of the current generation serving as a gene.

In accordance with embodiments of the present invention, the detection data is acquired, the feature quantity extraction algorithm is acquired, and the feature quantity of the detection data is calculated by processing the detection data in accordance with the feature quantity extraction algorithm. The feature quantity extraction algorithm includes the feature quantity calculation equation and the list of the final generation. The feature quantity calculation equation and the list of the final generation result from generating the list of the first generation containing the plurality data calculation equations by generating randomly the data calculation equations contained in the list, processing the predetermined learning data using the plurality of data calculation equations forming the generated list, learning the feature quantity calculation equation that is the linear combination of the plurality of data calculation equations forming the list, using the process results of the predetermined learning data, the feature quantity calculation equation being used to estimate predetermined supervisor data, determining the contribution ratio of each data calculation equation in the feature quantity calculation equation resulting from the learning, and generating the list of the second generation or the later generation in accordance with the genetic algorithm, the genetic algorithm using an evaluation value calculated from at least the contribution ratio of each data calculation equation with each data calculation equation contained in the list of the current generation serving as a gene.

The term "network" in the context of this specification refers to a mechanism in which at least two apparatuses are linked so that information is exchanged between one apparatus and the other apparatus. The apparatuses that communicate with each other via the network may be independent of each other or may be internal blocks contained in one apparatus.

The term "communication" in the context of this specification refers to wireless communication, wired communication, or a combination of both where wireless communication performed in one communication coverage area is combined with wired communication performed in the other communication coverage area. Furthermore, wired communication is performed from a first apparatus to a second apparatus, and wireless communication is performed from the second apparatus to a third apparatus.

The information processing apparatus may be a standalone apparatus and may be part of another apparatus having another function.

In accordance with embodiments of the present invention, an algorithm for determining a solution to a target problem is determined without increasing the number of process steps.

In accordance with embodiments of the present invention, the feature quantity is determined by a plurality of calculation equations instead of by a single excellent calculation equation.

BRIEF DESCRIPTION OF THE DRAWINGS

FIG. 1 illustrates a genetic search operation in the related art;

DESCRIPTION OF THE PREFERRED EMBODIMENTS

Before describing an embodiment of the present invention, the correspondence between the features of the present invention and an embodiment disclosed in the specification or the drawings of the invention is discussed below. This statement is intended to assure that embodiments supporting the claimed invention are described in this specification or the drawings. Thus, even if an embodiment is described in the specification or the drawings, but not described as relating to a feature of the invention herein, that does not necessarily mean that the embodiment does not relate to that feature of the invention. Conversely, even if an embodiment is described herein as relating to a certain feature of the invention, that does not necessarily mean that the embodiment does not relate to other features of the invention.

Figure 7:
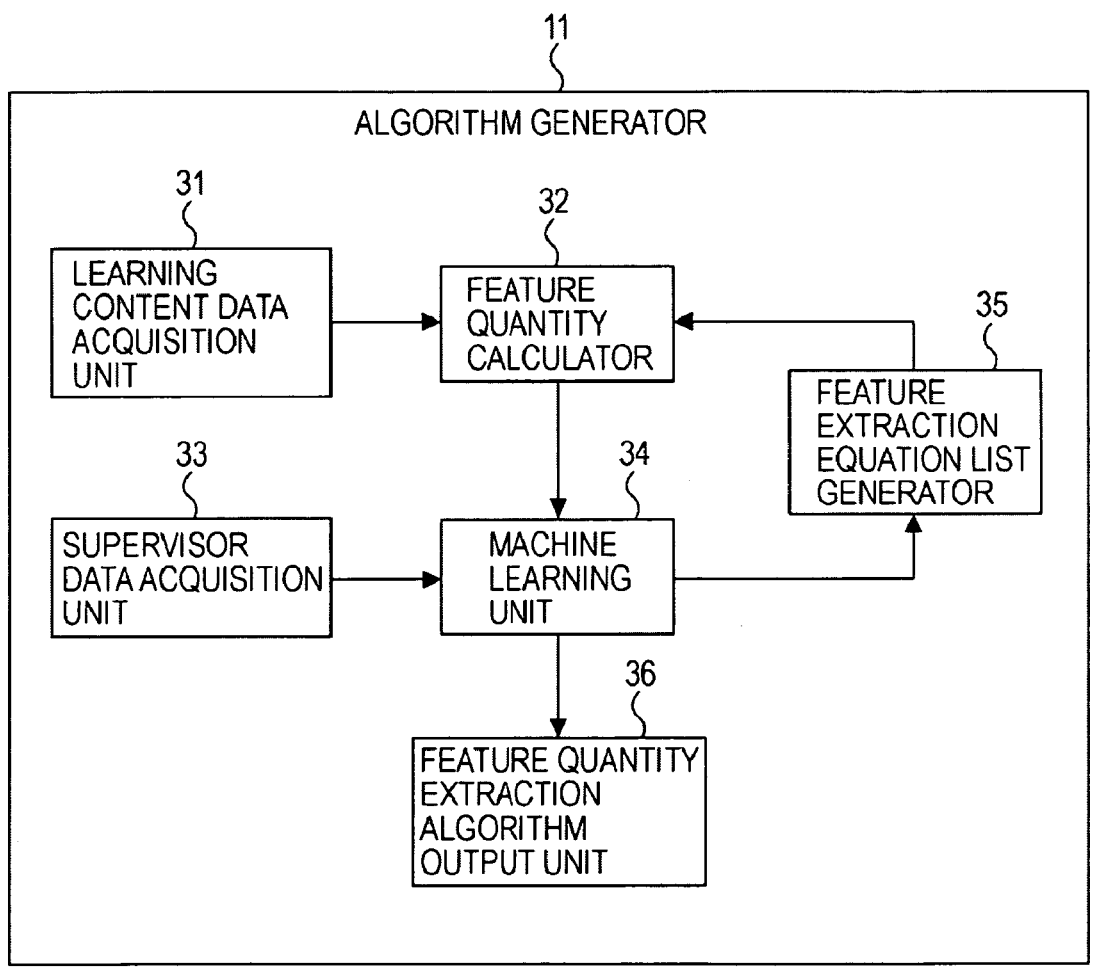
FIG. 7 is a block diagram illustrating in detail an algorithm generator of FIG. 3.

In accordance with one embodiment of the present invention, an information processing apparatus includes target problem acquisition means (for example, learning quantity data acquisition unit 31 and supervisor data acquisition unit 33 of FIG. 7) for acquiring a target problem, generation means (for example, feature extraction equation list generator 35 of FIG. 7) for generating a plurality of solution candidates to the target problem to solve the target problem, and contribution ratio calculating means (for example, machine learning unit 34 of FIG. 7) for calculating a contribution ratio of each solution candidate to the target problem if the target problem is solved using all the plurality of solution candidates to the target problem acquired by the target problem acquisition means. The generation means generates the solution candidate to the target problem in a next generation in accordance with a genetic algorithm that uses an evaluation value that is calculated using at least the contribution ratio of each solution candidate to the target problem calculated by the contribution ratio calculating meahs.

The target problem acquisition means may include first acquisition means (for example, learning quantity data acquisition unit 31 of FIG. 7) for acquiring learning data (for example, data resulting from analyzing audio data in terms of pitch and time or data represented in matrix), and second acquisition means (for example, supervisor data acquisition unit 33 of FIG. 7) for acquiring as supervisor data a solution to the target problem corresponding to the learning data, wherein the target problem acquisition means sets the target problem as the finding of means for determining from the learning data the solution corresponding to the learning data.

The generation means may include list generation means (for example, feature extraction equation list generator 35 of FIG. 7) for generating a list containing a plurality of data calculation equations. The contribution ratio calculating means may include calculation means (for example, feature quantity calculator 32 of FIG. 7) for performing a calculation operation on the learning data, acquired by the first acquisition means, using the plurality of data calculation equations contained in the list generated by the list generation means, and contribution ratio acquisition means for learning a feature quantity calculation equation using the calculation results of the calculation means, and for determining a contribution ratio of each data calculation equation in the feature quantity calculation equation obtained as a result of learning, the feature quantity calculation equation being used to estimate the supervisor data acquired by the second acquisition means and being a linear combination of output values of the plurality of data calculation equations contained in the list generated by the list generation means. The list generation means generates randomly the data calculation equations contained in the list of a first generation, and generates the list of a second generation or a later generation in accordance with a genetic algorithm, the genetic algorithm using an evaluation value calculated from the contribution ratio of each data calculation equation determined by the contribution ratio acquisition means with each data calculation equation contained in the list of a current generation serving as a gene.

The information processing apparatus may further include output means (for example, feature quantity extraction algorithm output unit 36 of FIG. 7) for outputting the feature quantity calculation equation learned by the contribution ratio acquisition means and the list of the final generation generated by the list generation means.

The information processing apparatus may further include third acquisition means (for example, detection content data acquisition unit 32 of FIG. 12) for acquiring detection data, and feature quantity arithmetic means (for example, feature quantity arithmetic unit 53 of FIG. 12) for calculating a feature quantity of the detection data by processing the detection data, acquired by the third acquisition means, using the feature quantity calculation equation learned by the contribution ratio acquisition means, and the list of the final generation generated by the list generation means.

Figure 27:
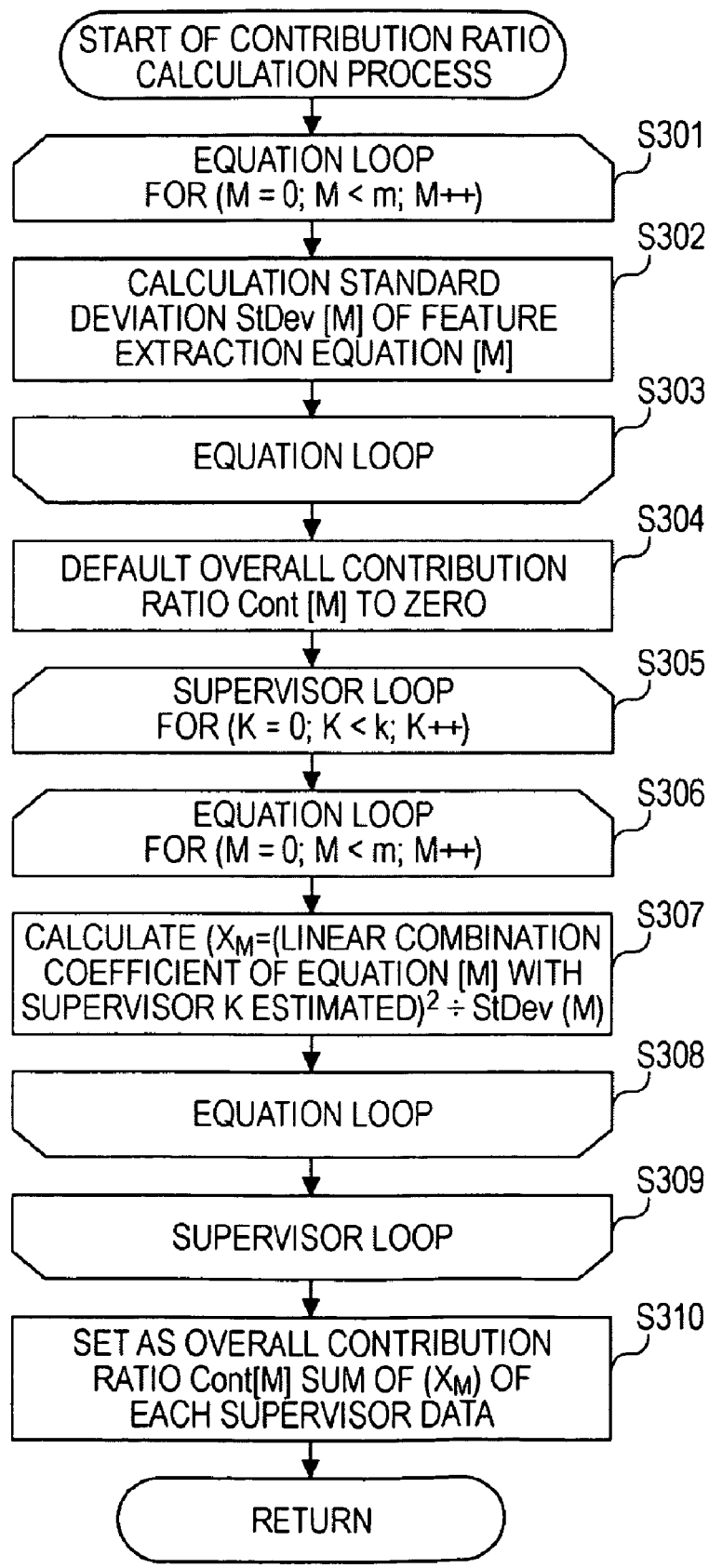
FIG. 27 is a flowchart illustrating a contribution ratio calculation process.

In accordance with one embodiment of the present invention, each of an information processing method and program of an information processing apparatus for determining a solution to a target problem, includes steps of acquiring the target problem (for example, in step S1 of FIG. 16), generating a plurality of solution candidates to the target problem to solve the target problem (for example, in a process to be discussed with reference to FIG. 18), and calculating a contribution ratio of each solution candidate to the target problem if the target problem is solved using all the plurality of solution candidates to the target problem (for example, in a process to be discussed with reference to FIG. 27). The generating includes generating the solution candidate to the target problem in a next generation in accordance with a genetic algorithm that uses an evaluation value that is calculated using at least the calculated contribution ratio of each solution candidate to the target problem.

Figure 12:
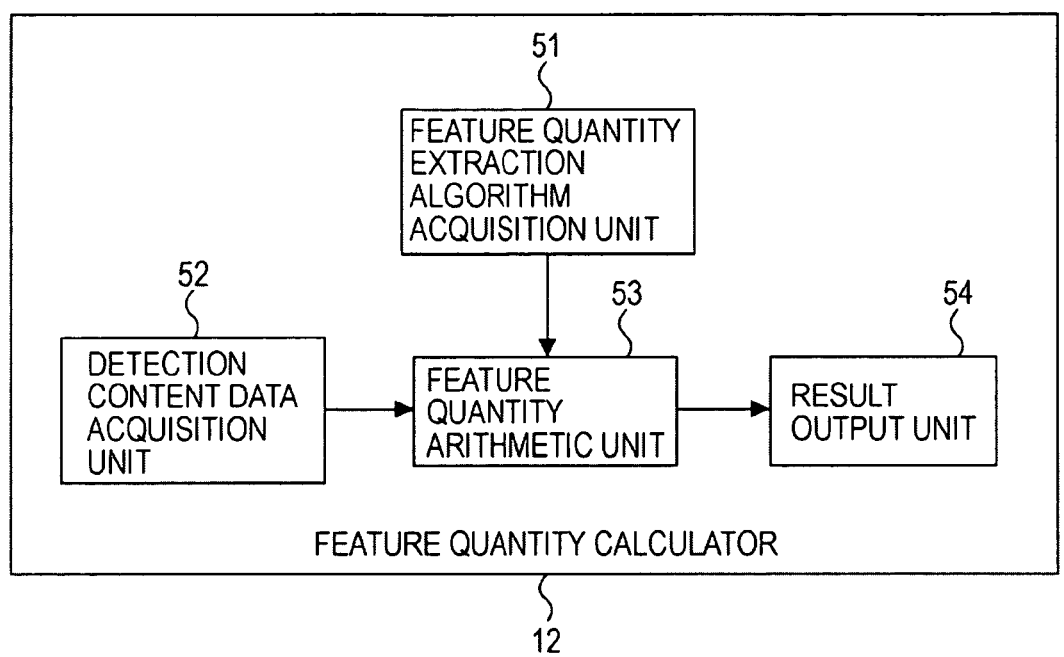
FIG. 12 is a block diagram illustrating in detail a feature quantity calculator of FIG. 3.

In accordance with one embodiment of the present invention, an information processing apparatus includes first acquisition means (for example, detection content data acquisition unit 52 of FIG. 12) for acquiring detection data, second acquisition means (for example, feature quantity extraction algorithm acquisition unit 51 of FIG. 12) for acquiring a feature quantity extraction algorithm, and feature quantity calculating means (for example, feature quantity arithmetic unit 53 of FIG. 12) for calculating a feature quantity of the detection data by processing the detection data, acquired by the first acquisition means, in accordance with the feature quantity extraction algorithm acquired by the second acquisition means, wherein the feature quantity extraction algorithm acquired by the second acquisition means includes a feature quantity calculation equation and a list of the final generation. The feature quantity calculation equation and the list of the final generation result from generating a list of a first generation (for example, a feature extraction equation list) containing a plurality data calculation equations (for example, feature extraction equation) by generating randomly the data calculation equations contained in the list, processing predetermined learning data using the plurality of data calculation equations forming the generated list, learning the feature quantity calculation equation that is a linear combination of the plurality of data calculation equations forming the list, using the process results of the predetermined learning data, the feature quantity calculation equation being used to estimate predetermined supervisor data, determining a contribution ratio of each data calculation equation in the feature quantity calculation equation resulting from the learning, and generating the list of a second generation or a later generation in accordance with a genetic algorithm, the genetic algorithm using an evaluation value calculated from at least the contribution ratio of each data calculation equation with each data calculation equation contained in the list of the current generation serving as a gene.

In accordance with one embodiment of the present invention, each of an information processing method and program of an information processing apparatus for calculating a feature quantity of detection data based on an algorithm for determining a solution to a target problem, includes steps of acquiring the detection data (for example, in step S333 of FIG. 28), acquiring a feature quantity extraction algorithm (for example, in step S332 of FIG. 28), and calculating a feature quantity of the detection data by processing the detection data in accordance with the feature quantity extraction algorithm (for example, in step S334 of FIG. 28), wherein the feature quantity extraction algorithm includes a feature quantity calculation equation and a list of the final generation. The feature quantity calculation equation and the list of the final generation result from generating a list of a first generation (for example, a feature extraction equation list) containing a plurality data calculation equations (for example, feature extraction equation) by generating randomly the data calculation equations contained in the list, processing predetermined learning data using the plurality of data calculation equations forming the generated list, learning the feature quantity calculation equation that is a linear combination of the plurality of data calculation equations forming the list, using the process results of the predetermined learning data, the feature quantity calculation equation being used to estimate predetermined supervisor data, determining a contribution ratio of each data calculation equation in the feature quantity calculation equation resulting from the learning, and generating the list of a second generation or a later generation in accordance with a genetic algorithm, the genetic algorithm using an evaluation value calculated from at least the contribution ratio of each data calculation equation with each data calculation equation contained in the list of the current generation serving as a gene.

The embodiments of the present invention are described below with reference to the drawings.

Figure 3:
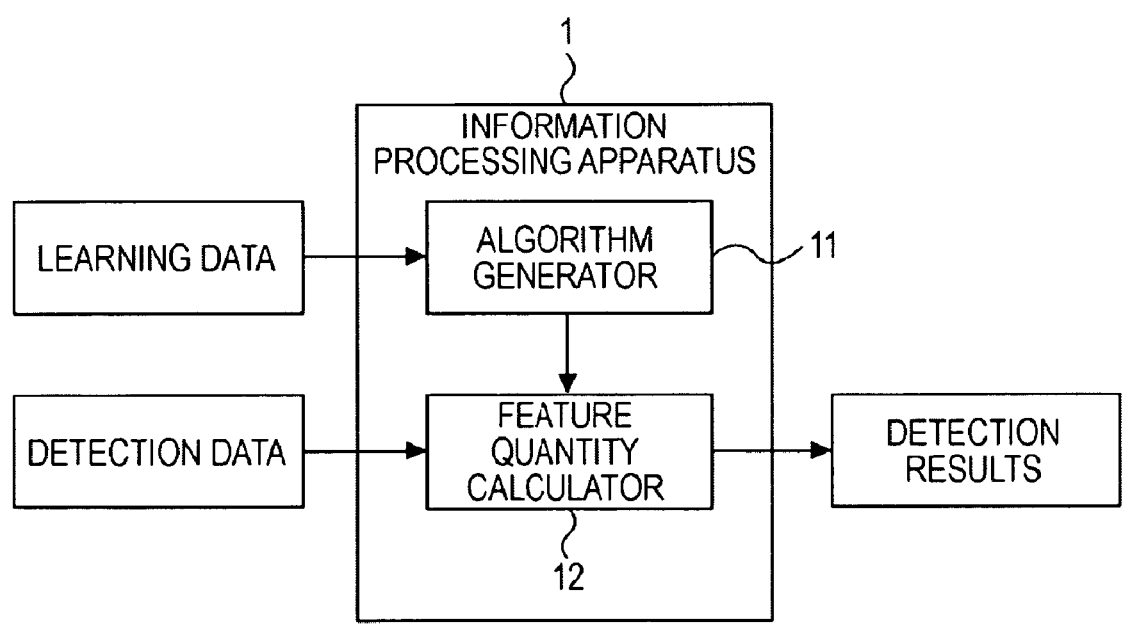
FIG. 3 illustrates an information processing apparatus in accordance with one embodiment of the present invention.

FIG. 3 is a block diagram illustrating a structure of an information processing apparatus 1 in accordance with one embodiment of the present invention.

The information processing apparatus 1 includes a feature quantity calculator 12 and an algorithm generator 11. Upon receiving detection data, the feature quantity calculator 12 calculates a feature quantity of the detection data. The algorithm generator 11 generates a feature quantity extraction algorithm to be used by the feature quantity calculator 12.

The algorithm generator 11 acquires a plurality of pieces of content data to be learned, and, as supervisor data, information relating to a feature quantity as a solution to a target problem with respect to the content data. Based on these pieces of information, the algorithm generator 11 generates a feature quantity extraction algorithm to be used by the feature quantity calculator 12, using a genetic search method (genetic algorithm).

Figure 4:
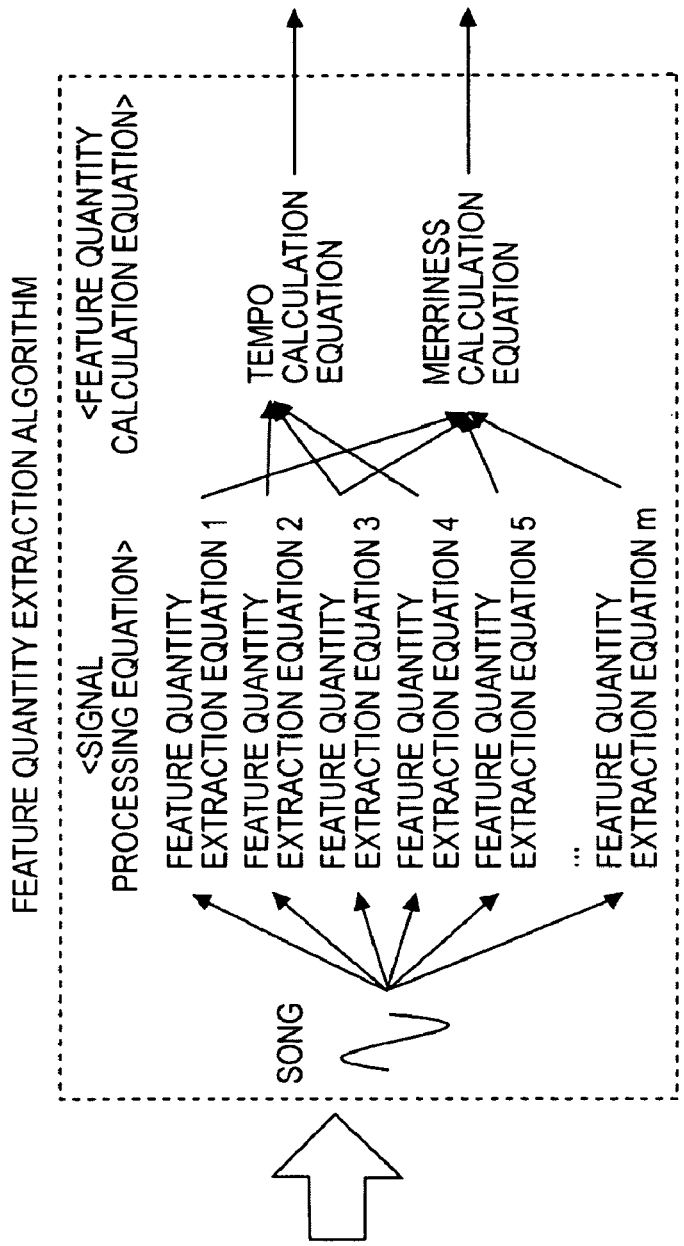
FIGS. 4A and 4B illustrate supervisor data and a feature extraction algorithm.

For example, the feature quantity extraction algorithm for determining the tempo and merriness of a song is desired. As shown in FIG. 4, song 1 through song 4 are provided as learning content data while tempo and merriness as a target problem are supplied to each of the songs as supervisor data. A plurality of feature extraction equations as a signal processing equation for signal processing the songs 1-4 are genes of the current generation.

The algorithm generator 11 performs an arithmetic operation on the learning content data using all the feature extraction equations. The arithmetic operation is a process based on the feature extraction equation. The feature extraction equation is a calculation equation for obtaining a feature quantity relating to the content data. The feature quantity then obtained may be different from a feature quantity as a solution to the target problem. In other words, the feature extraction equation cannot estimate a solution to the target problem of the content data.

Using the arithmetic operation results, a machine learning operation is performed. The machine learning operation can calculate a contribution ratio for each given type of supervisor (such as merriness and tempo here). The machine learning operation determines the feature quantity calculation equation for each type of supervisor (such as merriness and tempo here). The feature quantity calculation equation can estimate a solution to the target problem of the content data. The feature quantity calculation equation determines a contribution ratio of each feature extraction equation to solve the target problem.

Figure 5:
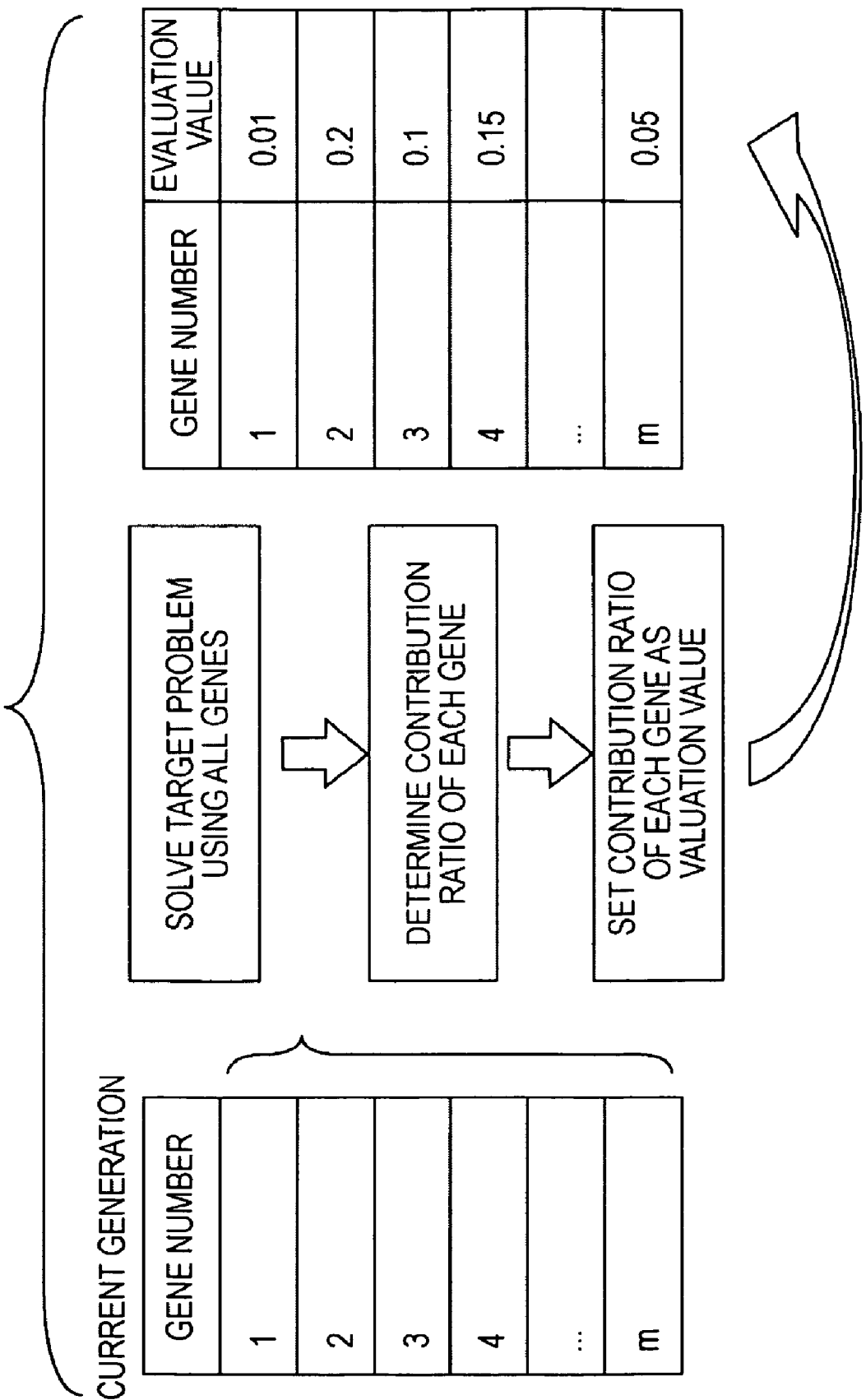
FIG. 5 illustrates a contribution ratio of each gene used as an evaluation value.

As shown in FIG. 5, the target problem is solved using all the genes of the current generation. The contribution ratio of each gene is determined with the target problem solved. The contribution ratio serves as an evaluation value of each gene. The gene search is performed based on the evaluation value.

Figure 6:
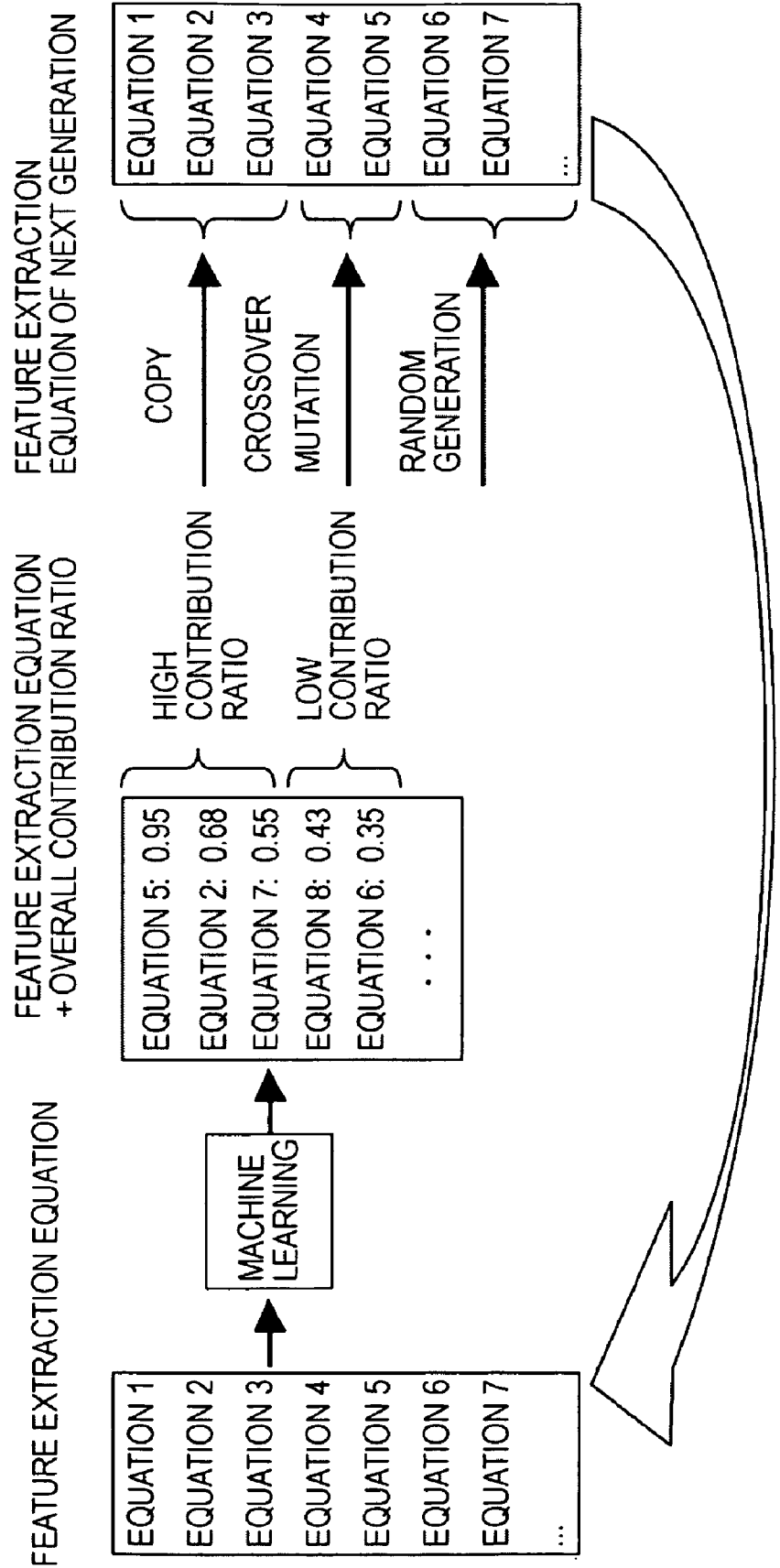
FIG. 6 illustrates a genetic search in which the contribution ratio of each gene is used as the evaluation value.

More specifically as shown in FIG. 6, the algorithm generator 11 performs the arithmetic operation on the input learning content data in accordance with the plurality of feature extraction equations, thereby calculating the feature quantity on a per feature extraction equation basis. The feature quantity calculation equation for solving the target problem through the machine learning operation is determined using the feature quantity of each feature extraction equation. The contribution ratio of each feature extraction equation in the feature quantity calculation equation is then calculated. The contribution ratio of each feature extraction equation serves as the evaluation value of the corresponding feature extraction equation. In the same manner as discussed with reference to the genetic search process of the related art of FIG. 1, the copy, crossover and mutation operations are performed and the random generation of the new feature extraction equation is performed. A plurality of feature extraction equations of a next generation are thus generated. The machine learning operation is then repeated with the plurality of feature extraction equations of the next generation served as those of the current generation.

More specifically, the algorithm generator 11 performs the machine learning operation on the feature quantity calculation equation to solve the target problem, based on the calculation results of all the m feature extraction equations and the supervisor data, and determines the contribution ratio to solve the target problem of the m feature extraction equations. Based on the contribution ratio of the feature extraction equation, the algorithm generator 11 generates a feature extraction equation list listing m feature extraction equations of the next generation. In other words, the algorithm generator 11 solves the target problem using all the m genes with the m feature extraction equations serving as the genes, calculates the contribution ratio at which each gene contributes to solving the target problem, and uses the contribution ratio as the evaluation value of the genetic algorithm.

The algorithm generator 11 supplies to the feature quantity calculator 12 the generated feature quantity extraction algorithm, namely, the feature quantity calculation equation of each supervisor and the plurality of feature extraction equations finally remaining subsequent to the genetic search process.

The feature quantity calculator 12 receives the input detection content data, and performs the feature quantity calculation process using the feature quantity extraction algorithm generated by the algorithm generator 11, thereby outputting detection results.

The feature quantity calculator 12 has the feature quantity extraction algorithm that determines the tempo and merriness of music data as the feature quantities. In response to unknown music data, the feature quantity calculator 12 determines the tempo and merriness of the unknown input music data using the feature quantity calculation equation of each supervisor, namely, the feature quantity calculation equation for determining the tempo of the music data, and the feature quantity calculation equation for determining the merriness of the music data.

The learning data and the detection data can be any type of data as long as the data has a plurality of axes, in other words, i.e., the data is expressed in a matrix of a plurality of dimensions.

The feature quantity calculator 12 thus receives the input detection data having the same axis as the learning data that has been used by the algorithm generator 11 in the generation of the feature quantity extraction algorithm, and solves the target problem using the feature quantity extraction algorithm.

FIG. 7 is a functional block diagram illustrating in detail the algorithm generator 11 of FIG. 3.

The algorithm generator 11 includes a learning content data acquisition unit 31, a feature quantity calculator 32, a supervisor data acquisition unit 33, a machine learning unit 34, a feature extraction equation list generator 35, and a feature quantity extraction algorithm output unit 36.

The learning content data acquisition unit 31 acquires learning content data to generate the feature quantity extraction algorithm and supplies the learning content data to the feature quantity calculator 32.

The feature quantity calculator 32 acquires from the feature extraction equation list generator 35 the feature extraction equation list listing m feature extraction equations as the genes, and calculates the feature quantity of the content data supplied from the learning content data acquisition unit 31, based on the m feature extraction equations.

The feature extraction equation can modify the input data represented in a plurality of dimensions into a single value, namely, a scalar value.

Figure 8:
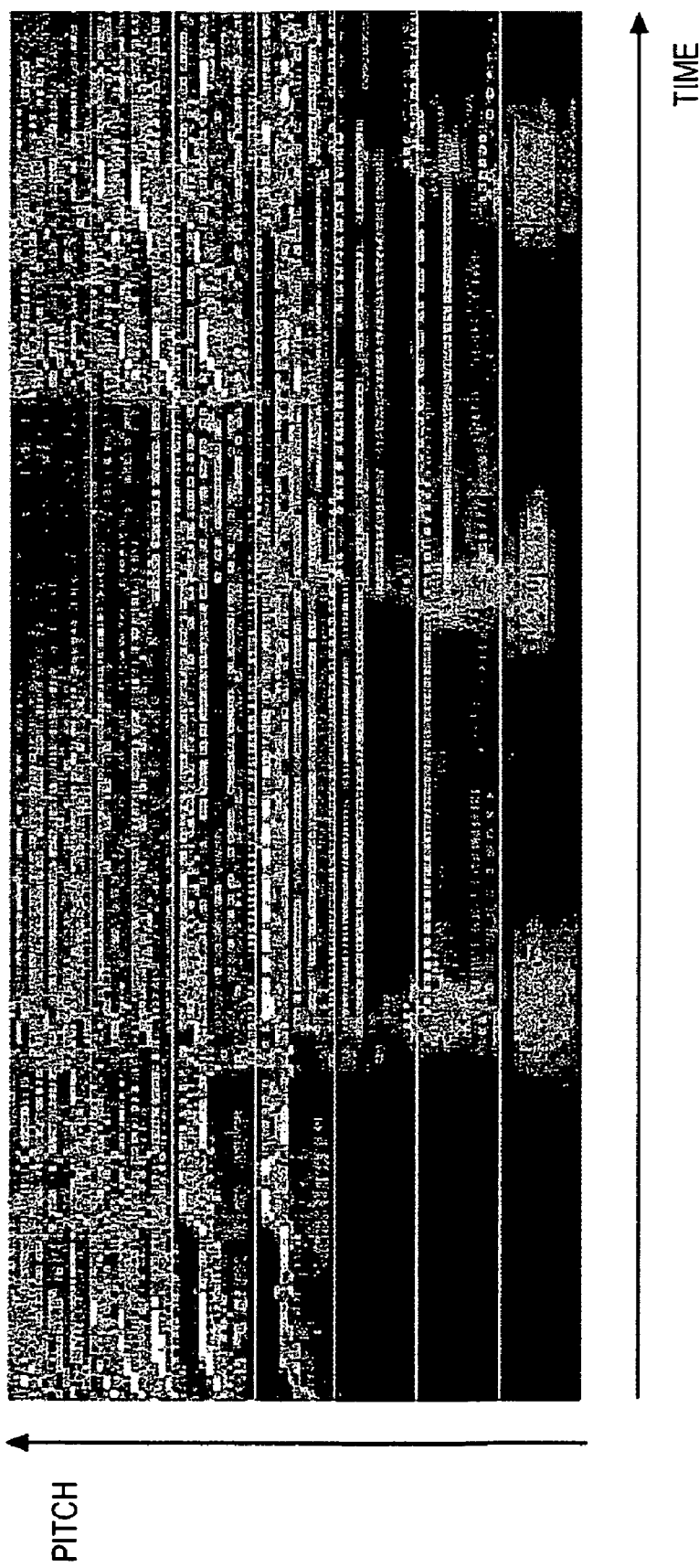
FIG. 8 illustrates an example of input data.

FIG. 8 illustrates a waveform of WAV data analyzed in time-pitch (frequency) with time and pitch of one octave of 12 tones.

As shown in FIG. 8, the ordinate as a pitch axis is graduated with one octave, and the abscissa represents time. Dark portions indicates a low energy area (at a low volume level). The lighter portions indicate a higher energy area (at a higher volume level).

Figure 9:
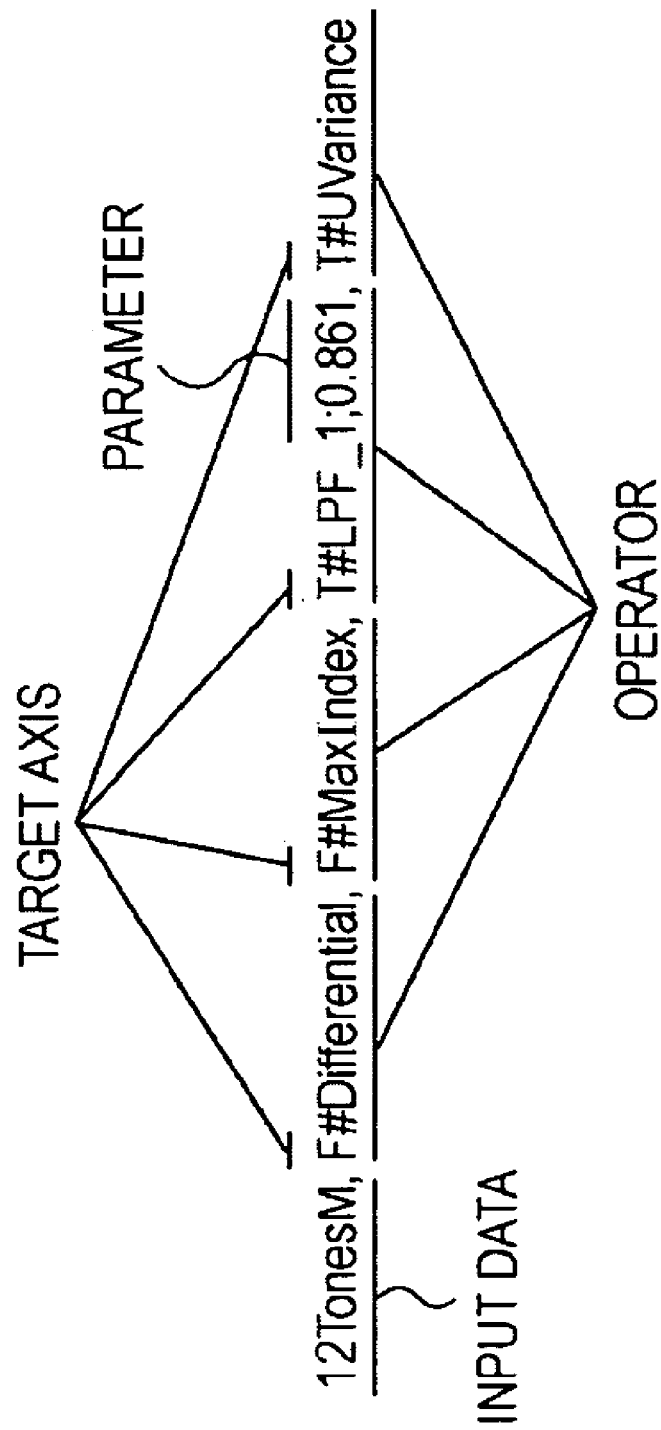
FIG. 9 illustrates a feature extraction equation of the input data of FIG. 8.

The feature extraction equation of FIG. 9 is applied to the analysis results shown in FIG. 8.

As shown in FIG. 9, the feature extraction equation contains information indicating the type of input data, and an operator as information indicating signal processing performed on the input data. The operator contains a target axis, a content of process, and a parameter to be processed as necessary. As shown in FIG. 9, 12 TonesM indicate the information of the type of input data, followed by four operators, namely, F#Differential, F#MaxIndex, T#LPF_1; 0.861, and T#UVariance in the order of processing. Placed at the head of each operator is the target axis. The target axes include T representing time direction and F representing the frequency and pitch direction.

The processes contained in the feature extraction equation of FIG. 9 include a differentiation operation represented by Differential, an acquisition operation of acquiring a maximum index, represented by MaxIndex, a low-pass filtering operation represented by LPF, and an unbiased variance operation represented by UVariance. Parameters are imparted to these operators as necessary. For example, 1; 0.861 is a parameter for a low-pass filter.

In response to the input of the analysis results of the waveform WAV data in time-pitch, the feature extraction equation represents calculation results obtained from differentiating the waveform in the pitch direction, calculating Index indicating a maximum value in the pitch direction (to obtain a pitch number showing the strongest sound), low-pass filtering the waveform in the time axis direction, and finally calculating the unbiased variance of the waveform. The feature extraction equation thus outputs the calculation results.

The supervisor data acquisition unit 33 acquires a solution to the target problem of the learning input data as supervisor data. For example, if the target problem is the tempo and merriness of the music data, the supervisor data acquisition unit 33 acquires information relating to the tempo and merriness of a plurality of pieces of learning input data acquired by the learning content data acquisition unit 31. The supervisor data may be the one determined from answers to questionnaire from a plurality of users.

The machine learning unit 34 performs a machine learning operation to calculate the contribution ratio, using the calculation results of each feature extraction equation calculated by the feature quantity calculator 32, namely, the feature quantity determined from each feature extraction equation by the feature quantity calculator 32. The machine learning unit 34 thus determines the feature quantity calculation equation for estimating the feature quantity as a solution to the target problem for each type of the given supervisor data (for example, tempo and merriness), and determines the contribution ratio of each feature extraction equation in the obtained feature quantity calculation equation.

The feature quantity calculation equation is determined for each type of the given supervisor data (such as tempo and merriness). The feature quantity calculation equation is to estimate the value of the target feature quantity by multiplying the results of feature extraction equations by predetermined coefficients and linear combining the multiplication results as shown in the following equation (1):

Tempo=output value of feature extraction equation
 1×0.5+output value of feature extraction equation
 2×0.7+ . . . +output value of feature extraction
 equation 5×0.1+output value of feature extraction
 equation 15×−0.4    (1)

The machine learning operation calculating the contribution ratio may be linear regression/discriminant analysis that uses, as an evaluation function, information criterion such as Akaike Information Criterion (AIC) or Bayesian Information Criterion (BIC), for example.

With selection/unselection of each feature extraction equation in the feature quantity extraction algorithm serving as a gene (i.e., whether to use the feature extraction equation), the machine learning unit 34 estimates target metadata (for example, the supervisor data as a value indicating tempo and merriness) using the selected feature extraction equation and learns the feature quantity extraction algorithm using a genetic algorithm. The genetic algorithm is based on the setting that the smaller the AIC or BIC of the selected feature extraction equation, the better.

More specifically, the machine learning unit 34 randomly generates several genes that determine whether to use the output value of the each feature extraction equation. The machine learning unit 34 performs linear regression/discriminant analysis on all genes, thereby evaluating the results in accordance with the evaluation function (such as AIC or BIC). By selecting the feature quantity to be used, the number of free parameters is reduced. A point providing a minimum AIC or BIC can be searched. Based on the evaluation value, the machine learning unit 34 performs the selection, crossover, and mutation operations on each gene, thereby varying the feature quantity in use. The machine learning unit 34 proceeds from one generation to a next generation until a better evaluation value is obtained no longer.

In accordance with the feature quantity calculation equation obtained through learning, the machine learning unit 34 determines the contribution ratio of each feature extraction equation by dividing each linear combination coefficient by a standard deviation of the output value of the feature extraction equation, by multiplying the resulting quotient by standard data of the supervisor data, and then by multiplying the resulting product by a correlation between the output value of the feature extraction equation and the supervisor data.

More specifically, let Y represent the target metadata (values indicating tempo and merriness), $X_M$ represent m feature quantities as the calculation results of the m feature extraction equations (M being an integer falling within a range of $1 \leq M \leq$ total number m of the feature extraction equations), $B_M$ represent the linear combination coefficient, and $B_0$ represent an intercept of the feature quantity calculation equation, and the feature quantity calculation equation obtained through learning is represented by the following equation (2):

$$Y = B_1 X_1 + B_2 X_2 + B_3 X_3 + \ldots + B_m X_m + B_0 \quad (2)$$

The value of the linear combination coefficient of the feature extraction equation unselected as a result of learning becomes zero.

The contribution ratio ($X_M$) of the feature extraction equation with Y of equation (2) estimated is calculated using the following equation (3):

$$X_M = B_M / \text{StDev}(X_M) \times \text{StDev}(T_M) \times \text{Correl}(X_M, T_M) \quad (3)$$

where $\text{StDev}(X_M)$ represents the standard deviation of $X_M$ with respect to all the learning input data provided for learning, $\text{StDev}(T_M)$ represents the standard deviation of the values of the supervisor data $T_M$ with respect to all the learning input data provided for learning, and $\text{Correl}(T_M)$ represents the Pearson's correlation coefficient of the values of $X_M$ and the supervisor data $T_M$ with respect to all the learning input data provided for learning.

The machine learning unit 34 supplies to the feature extraction equation list generator 35 the sum of the contribution ratios of all types of supervisors (for example, the sum of the contribution ratios of tempo and merriness) as the evaluation value of the genetic algorithm.

The machine learning unit 34 may determine the feature extraction equation (2) in a method different from the method of using the genetic algorithm with the determination of used/unused status of the output value of each feature extraction equation serving as a gene. For example, the machine learning unit 34 determines the used/unused status of the output value of each feature extraction equation using neighbor search method.

Using the neighbor search method, the machine learning unit 34 starts learning with all feature extraction equations in an unused status. The machine learning unit 34 then evaluates the AIC (or BIC) in a combination of M feature extraction equations with one use/unused status inverted. The machine learning unit 34 selects a combination having the highest evaluation value, namely, a combination having a low AIC value. Based on the selected combination, the machine learning unit 34 repeats the evaluation process on the AIC value with one used/unused status of the feature extraction equations inverted until the resulting evaluation value becomes better no longer. In accordance with the combination of the finally obtained used/unused combination of the feature extraction equations, the machine learning unit 34 generates the linear combination equation of equation (2). The process subsequent to the linear combination equation generation remains unchanged from the above discussion.

In accordance with the contribution ratio of the feature extraction equations obtained by the machine learning unit 34, the feature extraction equation list generator 35 performs the selection, crossover, and mutation operations to the feature extraction equations of the current generation according to the evaluation value as the contribution ratio. By performing a random generation of new feature extraction equations, the feature extraction equation list generator 35 generates a feature extraction equation list composed of m feature extraction equations of a next generation. The feature extraction equation list generator 35 randomly generates the feature extraction equation list composed of the m feature extraction equations of the next generation. Also, the feature extraction equation list generator 35 randomly generates the m feature extraction equations contained in the feature extraction equation list of a first generation in order to generate the feature extraction equation list of the first generation composed of the m feature extraction equations, and then supplies the feature extraction equation list of the first generation to the machine learning unit 34.

Figure 10:
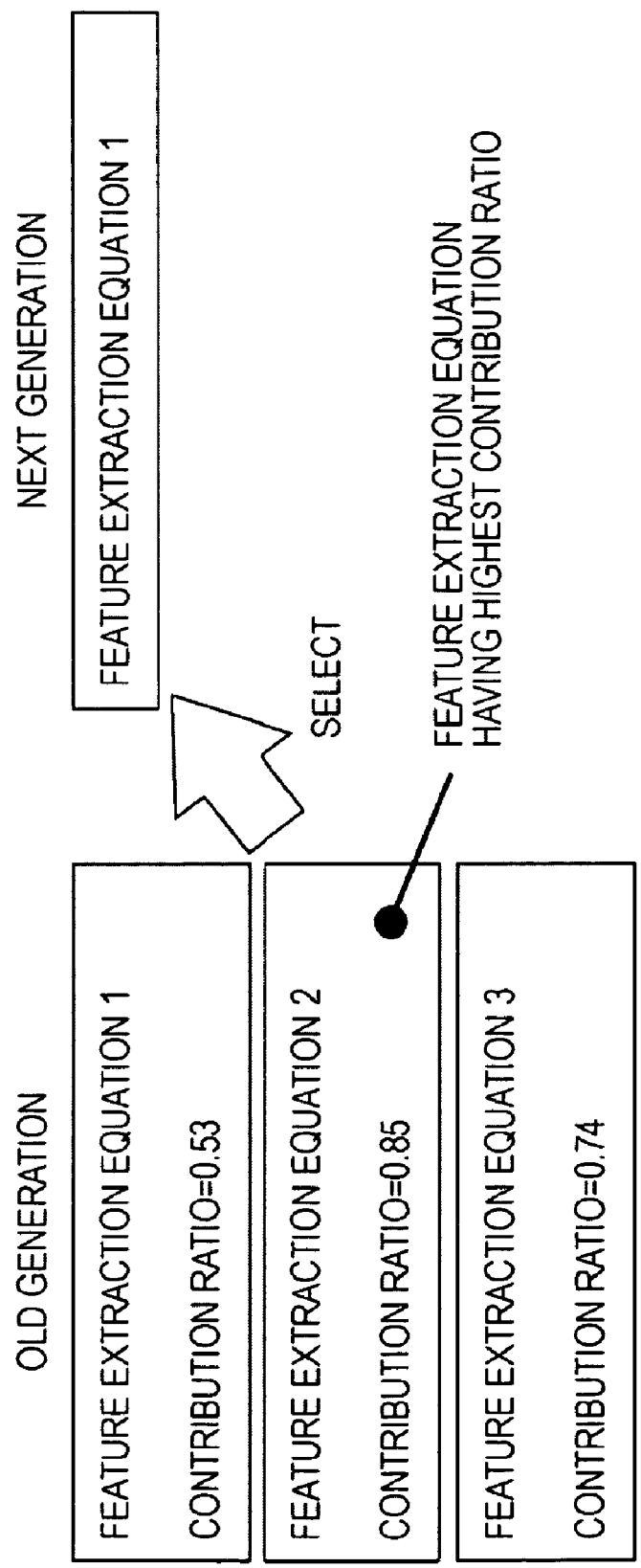
FIG. 10 illustrates a selection process.

As shown in FIG. 10, the feature extraction equation list generator 35 weights the feature extraction equations, in the order from the feature extraction equation having a high contribution ratio to the feature extraction equation having a low contribution ratio in accordance with the contribution ratios of the feature extraction equation obtained by the machine learning unit 34 or in the order that the feature extraction equation having a higher contribution ratio to be selected with a better chance. The feature extraction equation list generator 35 selects and copies the feature extraction equation (gene) to a next generation in accordance with the contribution ratios of the feature extraction equations.

The feature extraction equation list generator 35 weights the feature extraction equations so that a feature extraction equation having a high contribution ratio is selected with a better chance while selecting two feature extraction equations. The feature extraction equation list generator 35 combines (cross over) the two feature extraction equations, thereby generating feature extraction equations of a next generation at a predetermined ratio (by a predetermined number).

For example, a first selected feature extraction equation is "12 TonesM, F#aaaa, F#bbbb, T#cccc, T#dddd" and a second selected feature extraction equation is "12 TonesM, Sqrt, F#gggg, F#hhhh, F#iiii, T#jjjj, T#kkkk" (here, aaaa, bbbb, . . . respectively represent operators). The feature extraction equation list generator 35 combines parts of the two equations in a combination that a scalar quantity is determined from input data (here 12 TonesM) by calculating the feature extraction equation subsequent to the combination, i.e., in a combination that causes no inconsistency in the target axes if the calculation process is performed on the feature extraction equations starting with the leading feature extraction equation. More specifically, the feature extraction equation list generator 35 combines "F#aaaa, F#bbbb, T#cccc" of the first selected feature extraction equation "12 TonesM, F#aaaa, F#bbbb, T#cccc, T#dddd" and, "T#jjjj, T#kkkk" of the second selected feature extraction equation "12 TonesM, Sqrt, F#gggg, F#hhhh, F#iiii, T#jjjj, T#kkkk", thereby generating a feature extraction equation of "12 TonesM, F#aaaa, F#bbbb, T#cccc, "T#jjjj, T#kkkk", and handling the generated feature extraction equation as a feature extraction equation of the next generation.

The feature extraction equation list generator 35 selects a single feature extraction equation while weighting the feature extraction equations so that a feature extraction equation having a high contribution ratio is selected with a better chance. The feature extraction equation list generator 35 thus modifies parts of the selected feature extraction equations, thereby generating a feature extraction equation of the next generation at a predetermined ratio (at a predetermined number).

For example, if a selected feature extraction equation is "12 TonesM, F#mmmm, F#nnnn, T#oooo, T#pppp, T#qqqq," the feature extraction equation list generator 35 modifies part of the feature extraction equation in a manner such that a scalar quantity is determined from input data (here 12 TonesM) by calculating the feature extraction equation subsequent to the modification of part of the feature extraction equation, i.e., in a manner such that no inconsistency is caused in the target axes if the calculation process is performed on the feature extraction equations starting with the leading feature extraction equation. More specifically, the feature extraction equation list generator 35 replaces at least one operator in the selected feature extraction equation with different operators to modify the feature extraction equation to "12 TonesM, F#xxxx, F#yyyy, T#oooo, T#pppp, T#qqqq," thereby generating a feature extraction equation of the next generation. Furthermore, the feature extraction equation list generator 35 deletes at least one operator from the selected feature extraction equation to modify the selected feature extraction equation to "12 TonesM, F#mmmm, F#nnnn, T#oooo, T#qqqq," thereby generating a feature extraction equation of the next generation. The feature extraction equation list generator 35 also modifies at least part of a parameter contained in an operator of the selected feature extraction equation, thereby generating a feature extraction equation of the next generation. As previously discussed, the feature extraction equation list generator 35 combines the modification and deletion operations of the operation and the modification of the parameter, thereby generating a feature extraction equation of the next generation.

The feature extraction equation list generator 35 randomly generates the feature extraction equation at a predetermined ratio (at a predetermined number), thereby adding the generated feature extraction equation as a feature extraction equation of the next generation. It is noted that the feature extraction equation list generator 35 generates all feature extraction equations in the first generation.

Figure 11:
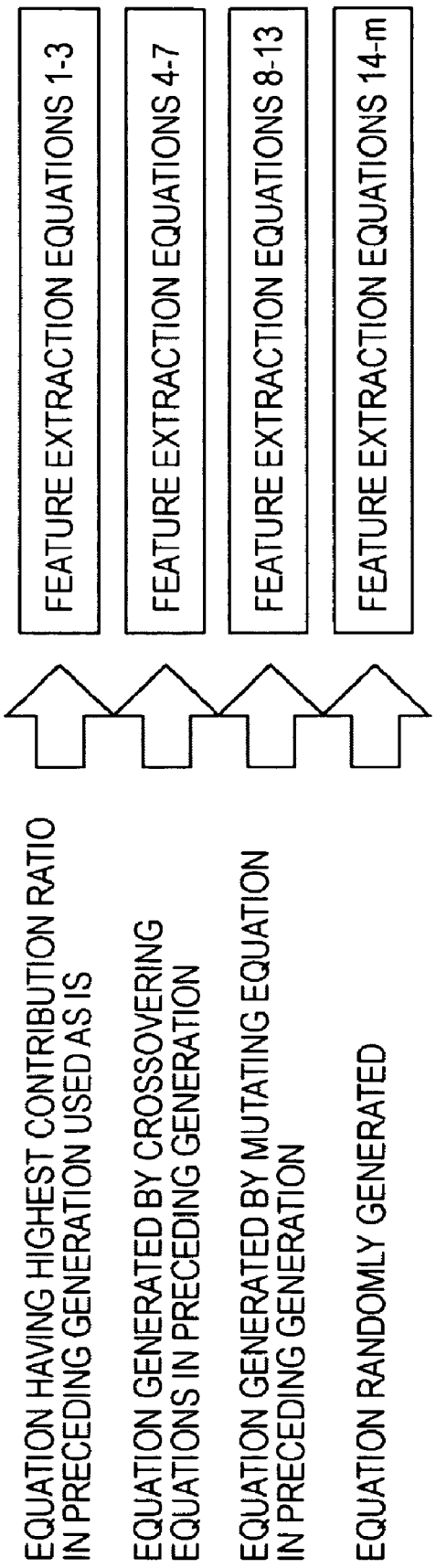
FIG. 11 illustrates a genetic search in which the contribution ratio of each gene is used as the evaluation value.

More specifically, when the feature extraction equation list of the second and next generations is generated as shown in FIG. 11, the feature extraction equation list generator 35 selects the feature extraction equations at a predetermined ratio or of a predetermined number (three in this case) having high contribution ratios, and copies the selected feature extraction equations to the next generation. The feature extraction equation list generator 35 selects the feature extraction equations at a predetermined ratio or of a predetermined number (eight in this case) having high contribution ratios, and generates a feature extraction equation of the next generation using the crossover operation. The feature extraction equation list generator 35 selects the feature extraction equations at a predetermined ratio or of a predetermined number (six in this case) having high contribution ratios, and generates a feature extraction equation of the next generation using the mutation operation. The feature extraction equation list generator 35 generates the remaining feature extraction equations so that a total of m feature extraction equations are generated. The feature extraction equation list generator 35 then supplies the generated feature extraction equations to the machine learning unit 34.

The processes of the feature quantity calculator 32, the machine learning unit 34 and the feature extraction equation list generator 35 are repeated until a predetermined number of generations has advanced, until the calculation results of the feature quantity calculation equation obtained by the machine learning unit 34 reach a predetermined accuracy level, or until a learning end operation is input by the user. The feature quantity calculation equation and the m feature extraction equations at the generation thereof finally obtained by the machine learning unit 34 are supplied to the feature quantity extraction algorithm output unit 36 as the feature quantity extraction algorithm.

The feature quantity extraction algorithm output unit 36 supplies to the feature quantity calculator 12 the feature quantity calculation equation and the m feature extraction equations in the generation thereof finally obtained by the machine learning unit 34.

FIG. 12 is a functional block diagram illustrating in detail the feature quantity calculator 12 of FIG. 3.

The feature quantity calculator 12 includes a feature quantity extraction algorithm acquisition unit 51, a detection content data acquisition unit 52, a feature quantity arithmetic unit 53, and a result output unit 54.

The feature quantity extraction algorithm acquisition unit 51 receives from the feature quantity extraction algorithm output unit 36 the feature quantity extraction algorithm, i.e., the feature quantity calculation equation and the m feature extraction equations, processed as described above to estimate a solution to the target problem, and then supplies the feature quantity extraction algorithm to the feature quantity arithmetic unit 53.

The detection content data acquisition unit 52 acquires the detection content data (such as data resulting from analyzing audio waveform of WAV in time axis and pitch axis) to detect the feature quantity in accordance with the feature quantity extraction algorithm, and then supplies the detection content data to the feature quantity arithmetic unit 53.

The feature quantity arithmetic unit 53 calculates the detection content data based on the feature quantity extraction algorithm and the m feature extraction equations, acquired by the feature quantity extraction algorithm acquisition unit 51, and calculates the solution to the target problem (for example, the tempo and the merriness of the music data).

The result output unit 54 notifies the user of the solution to the target problem (for example, the tempo and the merriness of the music data), for example, by outputting the solution to an external device, displaying the solution in text data, or outputting an audio as audio data responsive to the solution.

Figures 2A, 2B:
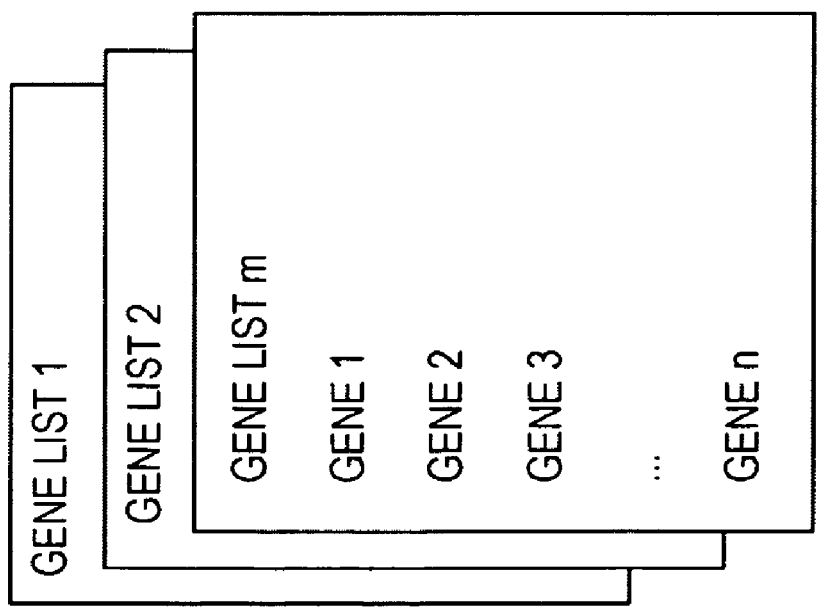
FIGS. 2A and 2B illustrate a genetic search operation disclosed in the related art.

The evaluation value imparted to each gene in the genetic search method of the related art described with reference to FIG. 1 is a value indicating the closeness to the target problem (or is an evaluation value such as AIC). A combination of the best feature quantities is determined to solve the target problem using a plurality of feature quantities in the method of the related art previously discussed with reference to FIG. 2. In this method, a value indicating the closeness to the target problem (or an evaluation value such as AIC) is imparted to each gene list if the target problem is solved using the plurality of feature extraction equations forming each gene list. The contribution ratio is imparted to each feature quantity (equation) in the gene list, and is not used at all in the selection process of the gene list from the gene lists of the current generation. An evaluation value imparted to each gene list is used in the selection process of the gene list from the gene lists of the current generation.

In contrast, the algorithm generator 11 of FIG. 3 causes the target problem to be solved with all the genes, calculates the contribution ratio of each gene indicating how much the gene contributes to the solution to the target problem, and performs the gene search with the contribution ratio serving as the evaluation value.

An unselected gene does not affect the next generation at all in the gene search method in the related art. Also in the technique disclosed in International Publication No. WO2007/049641, an evaluation value is determined on a per gene list basis and a gene list of a next generation is generated based on the evaluation value. An unselected gene listed in a gene list does not affect a next generation at all as in the same manner as in the technique in the related art. In contrast, the algorithm generator 11 of FIG. 3 uses the contribution ratio of each gene that is applied if the target problem is solved using all the current genes, and even an unselected gene affects the next generations.

The type of information from which the feature quantity extraction algorithm can be determined through the above-described process may be any information that can be represented in a matrix. More specifically, the type of input learning data to be supplied to the algorithm generator 11, i.e., the type of detection data to be input to the feature quantity calculator 12 to determine the feature quantity may be any type of information that can be represented in a matrix, such as music, images, or other binary data.

Figure 13:
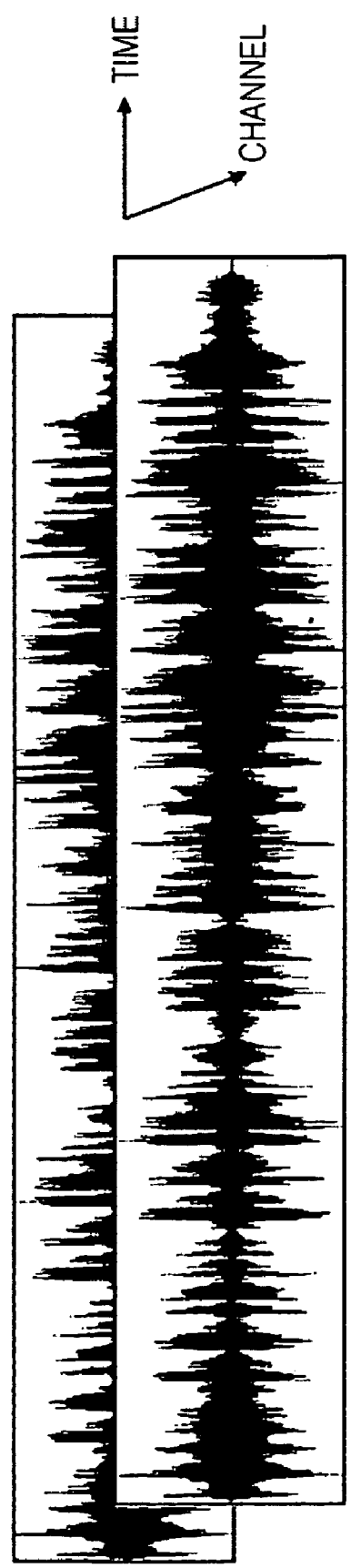
FIG. 13 illustrates the input data.

For example, an audio waveform may be analyzed as a matrix of amplitude, time, and channel as shown in FIG. 13.

Figure 14:
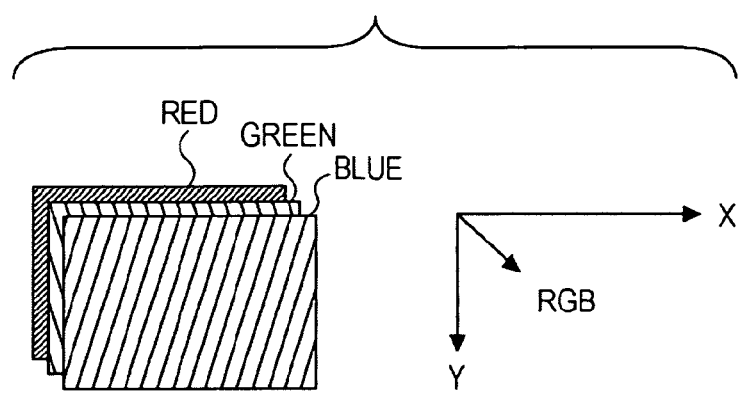
FIG. 14 illustrates the input data.

Also, for example, the image may be analyzed as a matrix of X axis and Y axis of a frame and RGB (red, green and blue) as shown in FIG. 14.

Figure 15:
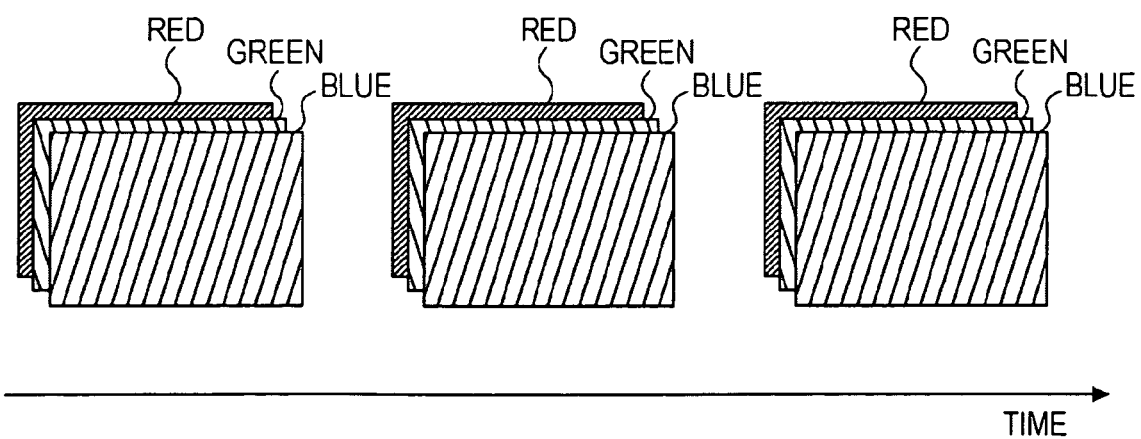
FIG. 15 illustrates the input data.

Further, a moving image may be analyzed as a matrix of X axis and Y axis of a frame, RGB, and time as shown in FIG. 15.

As previously discussed, the algorithm generator 11 thus generates the feature quantity extraction algorithm that allows the target problem to be solved with all the genes used instead of with a single excellent gene used.

For example, the target problem may be to determine the estimated number of sales of copies of a new song that one artist is going to release. The music factors of that song including, not only a waveform of the sound of the song, but also the lyrics of the song, and the discography of that artist, affect the sales volume of the song as a feature quantity of the song, namely, the solution to the target problem. The algorithm generator 11 generates the feature quantity extraction algorithm using a variety of factors affecting the extraction of the feature quantity.

For example, the algorithm generator 11 is supplied with the sales volume of a plurality of songs as the supervisor data. The algorithm generator 11 is also supplied with the waveforms of the songs, jacket photographs, lyrics, and related information, as the learning content data. Using these pieces of information, the algorithm generator 11 performs a learning process with the sales volume of the songs being the target problem, thereby generating and supplying the feature quantity extraction algorithm to the feature quantity calculator 12. If information, such as the waveform of the song that the artist is going to release, the jacket photograph of the song, the lyrics of the song, and the relating information of the song, is input to the feature quantity calculator 12, the feature quantity calculator 12 provides the solution to the estimated sales volume of the song (for example, a prediction of the sales volume by several tens of thousands, or a rank indicating a large sales volume, a medium sales volume, or a small sales volume may also be acceptable instead of actual sales volume). In response to the feature quantity extraction algorithm from the algorithm generator 11, the quantity calculator 12 extracts an accurate feature quantity taking into every data in a comprehensive manner.

In the above discussion, the information processing apparatus 1 includes the algorithm generator 11 and the feature quantity calculator 12. Alternatively, the algorithm generator 11 and the feature quantity calculator 12 may be arranged as separate apparatuses. The algorithm generator 11 and the feature quantity calculator 12 may be remotely arranged from each other as long as the feature quantity extraction algorithm generated by the algorithm generator 11 can be supplied to the feature quantity calculator 12.

The algorithm generation process of the algorithm generator 11 is described below with reference to a flowchart of FIG. 16.

In step S1, the learning content data acquisition unit 31 in the algorithm generator 11 receives the learning data and then supplies the received learning data to the feature quantity calculator 32. The supervisor data acquisition unit 33 receives the supervisor data and then supplies the received supervisor data to the machine learning unit 34.

Figure 17:
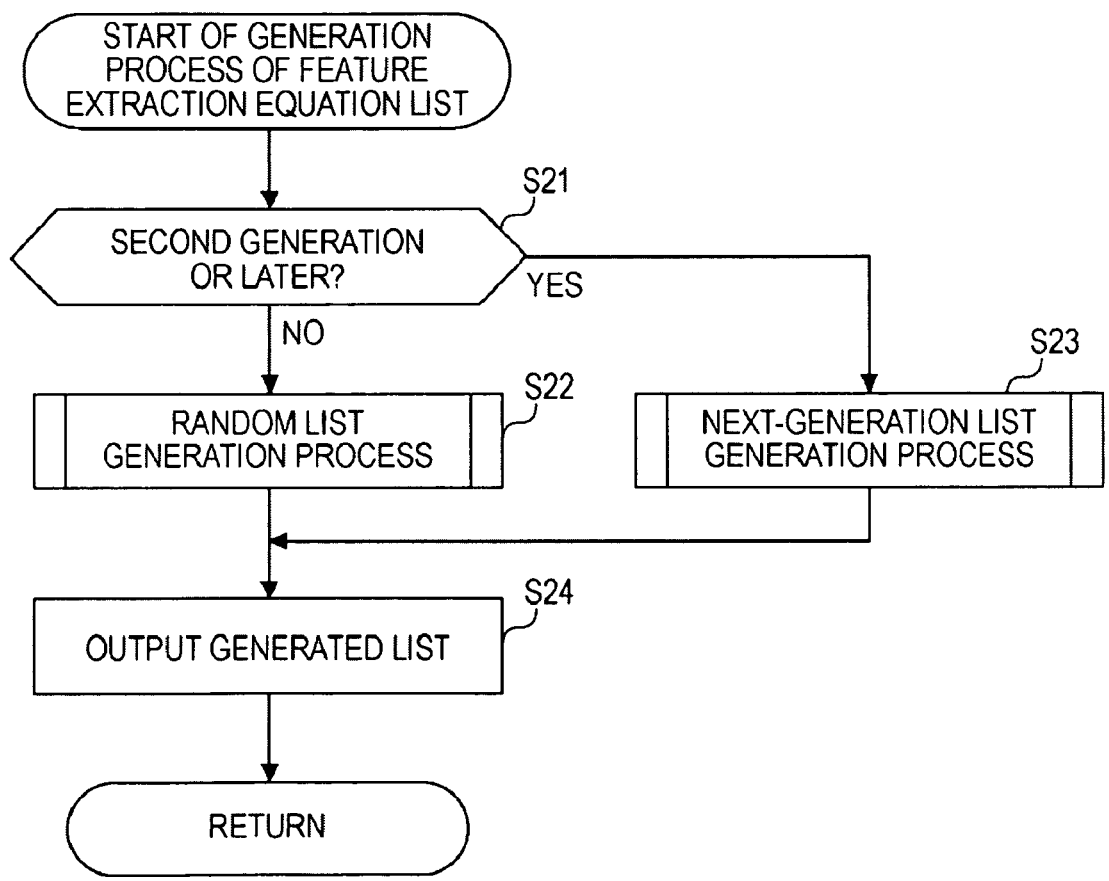
FIG. 17 is a flowchart illustrating a feature extraction equation list generation process.

In step S2, a feature extraction equation list generation process to be discussed with reference to FIG. 17 is performed.

Figure 24:
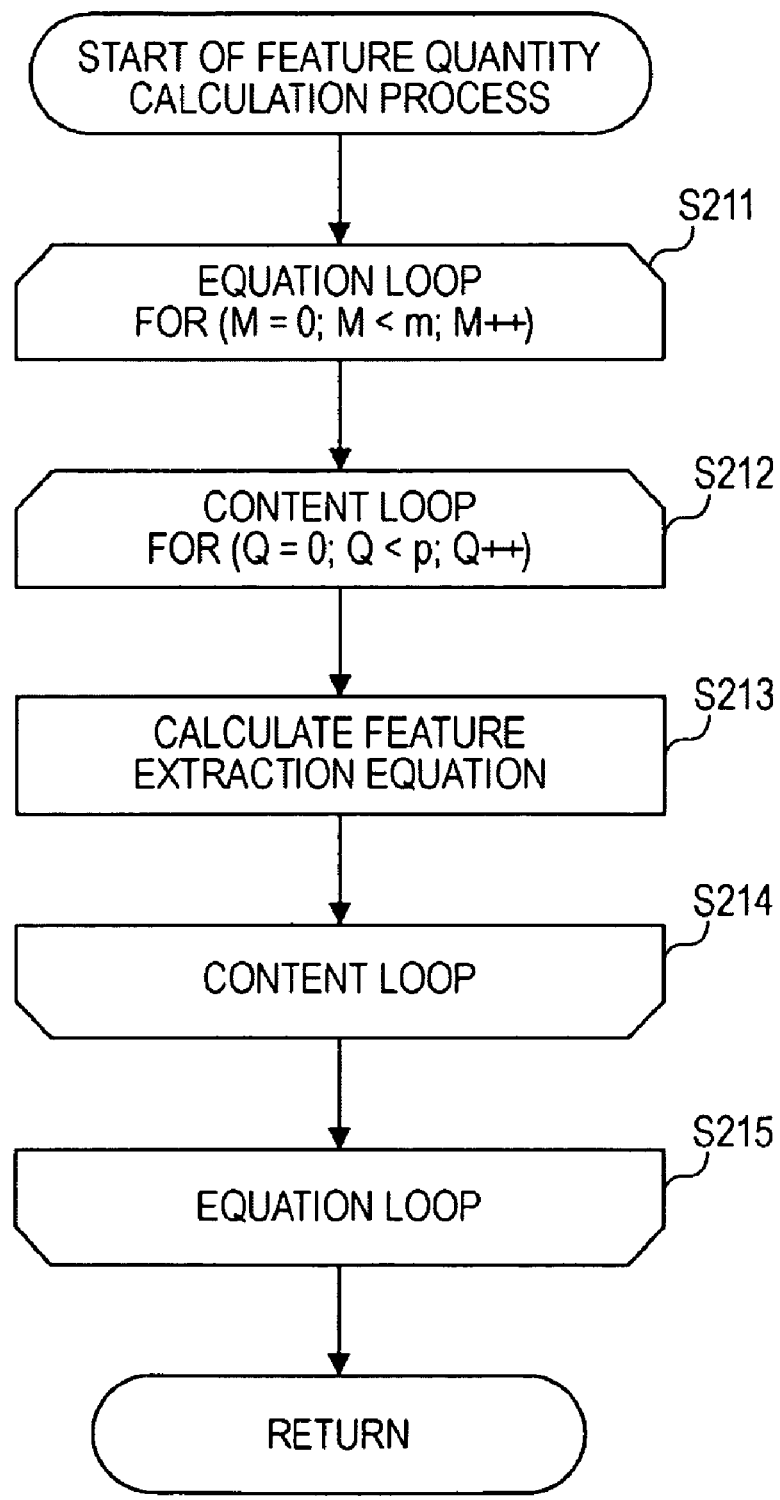
FIG. 24 is a flowchart illustrating a feature quantity calculation process.

In step S3, a feature quantity calculation process to be discussed with reference to FIG. 24 is performed.

Figure 25:
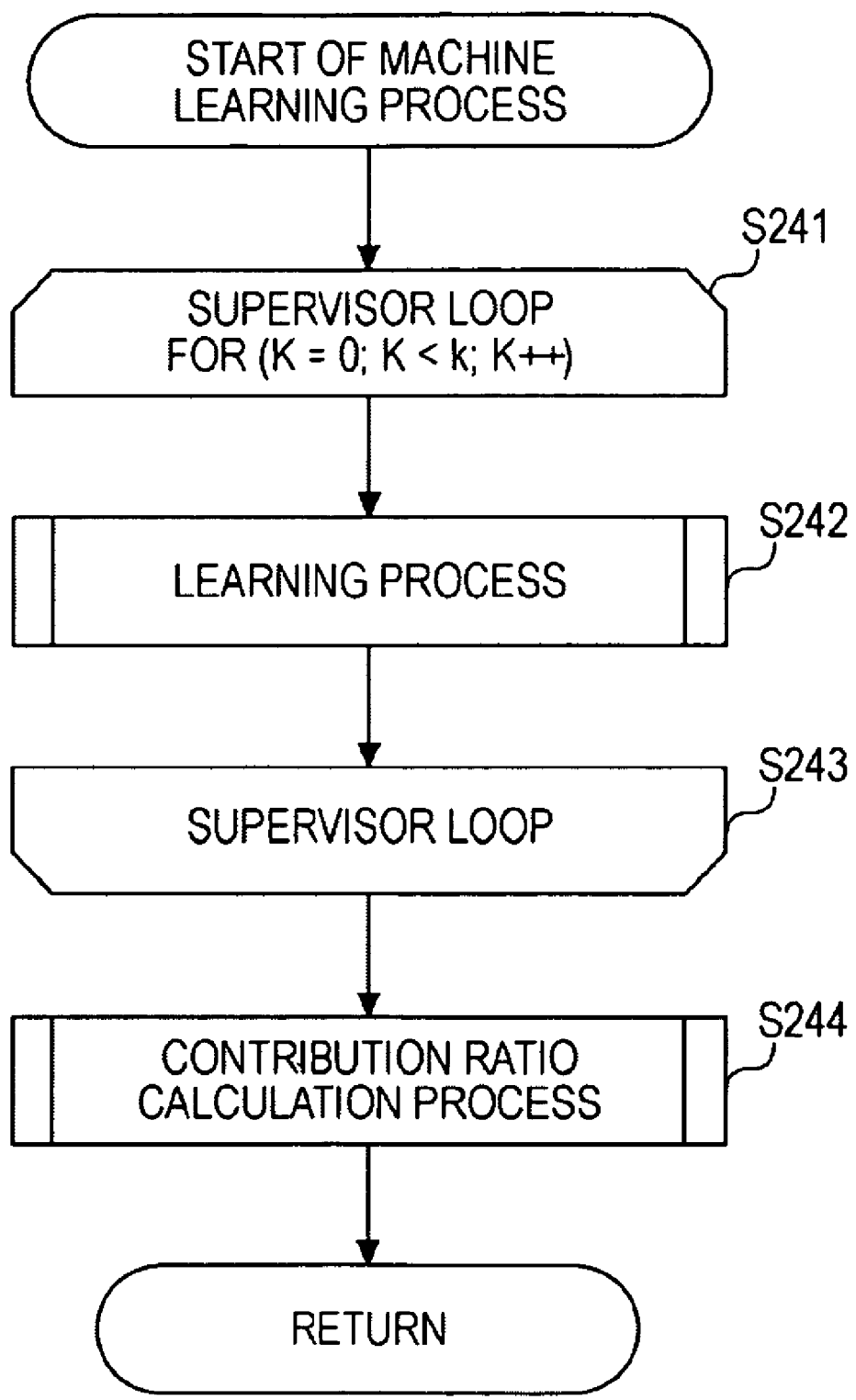
FIG. 25 is a flowchart illustrating a machine learning process.

In step S4, a machine learning process to be discussed with reference to FIG. 25 is performed.

In step S5, the machine learning unit 34 determines whether the feature quantity calculated in accordance with the obtained feature quantity calculation equation has reached a predetermined accuracy level with respect to the supervisor data or determines whether the user has performed an ending operation.

If it is determined in step S5 that the predetermined accuracy level has not been reached and that the user has not performed the ending operation, processing returns to step S2 to repeat step S2 and subsequent steps.

If it is determined in step S5 that the predetermined accuracy level has been reached or that the user has performed the ending operation, the machine learning unit 34 supplies in step S6 the obtained feature quantity calculation equation and the feature extraction equations in that generation to the feature quantity extraction algorithm output unit 36. The feature quantity extraction algorithm output unit 36 outputs the feature quantity calculation equation and the feature extraction equations in that generation to the feature quantity calculator 12 or to one of a transmission medium and a removable recording medium that supplies these pieces of data to the feature quantity calculator 12. The algorithm generation process is thus completed.

The algorithm generation process generates the feature quantity extraction algorithm that causes the algorithm generator 11 to obtain a solution to the target problem with a plurality of feature extraction equations.

Figure 16:
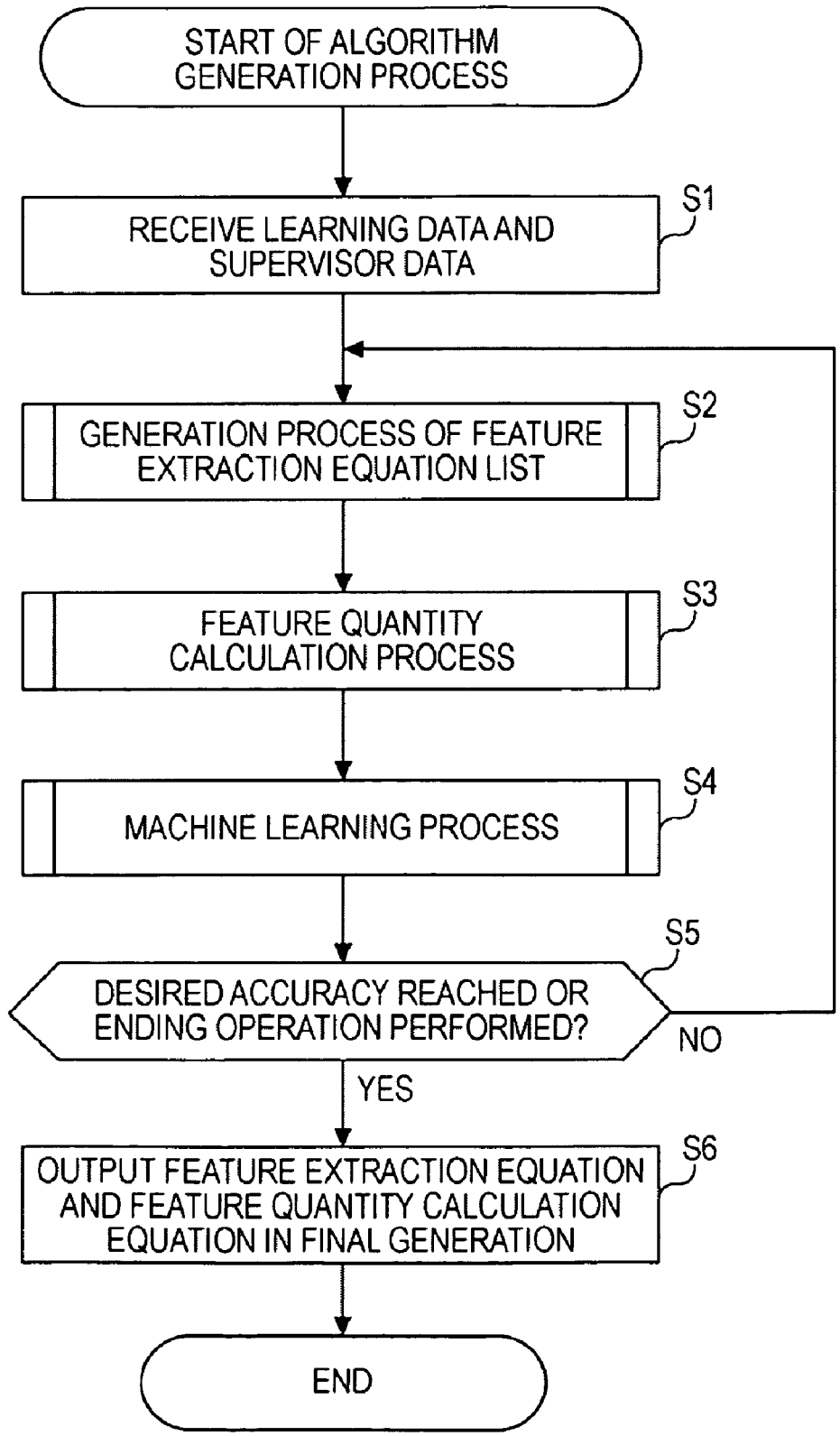
FIG. 16 is a flowchart illustrating an algorithm generation process.

The feature extraction equation list generation process preformed in step S2 of FIG. 16 is described below with reference to a flowchart of FIG. 17.

In step S21, the feature extraction equation list generator 35 determines whether the feature extraction equation list to be generated is a second or later generation.

Figure 18:
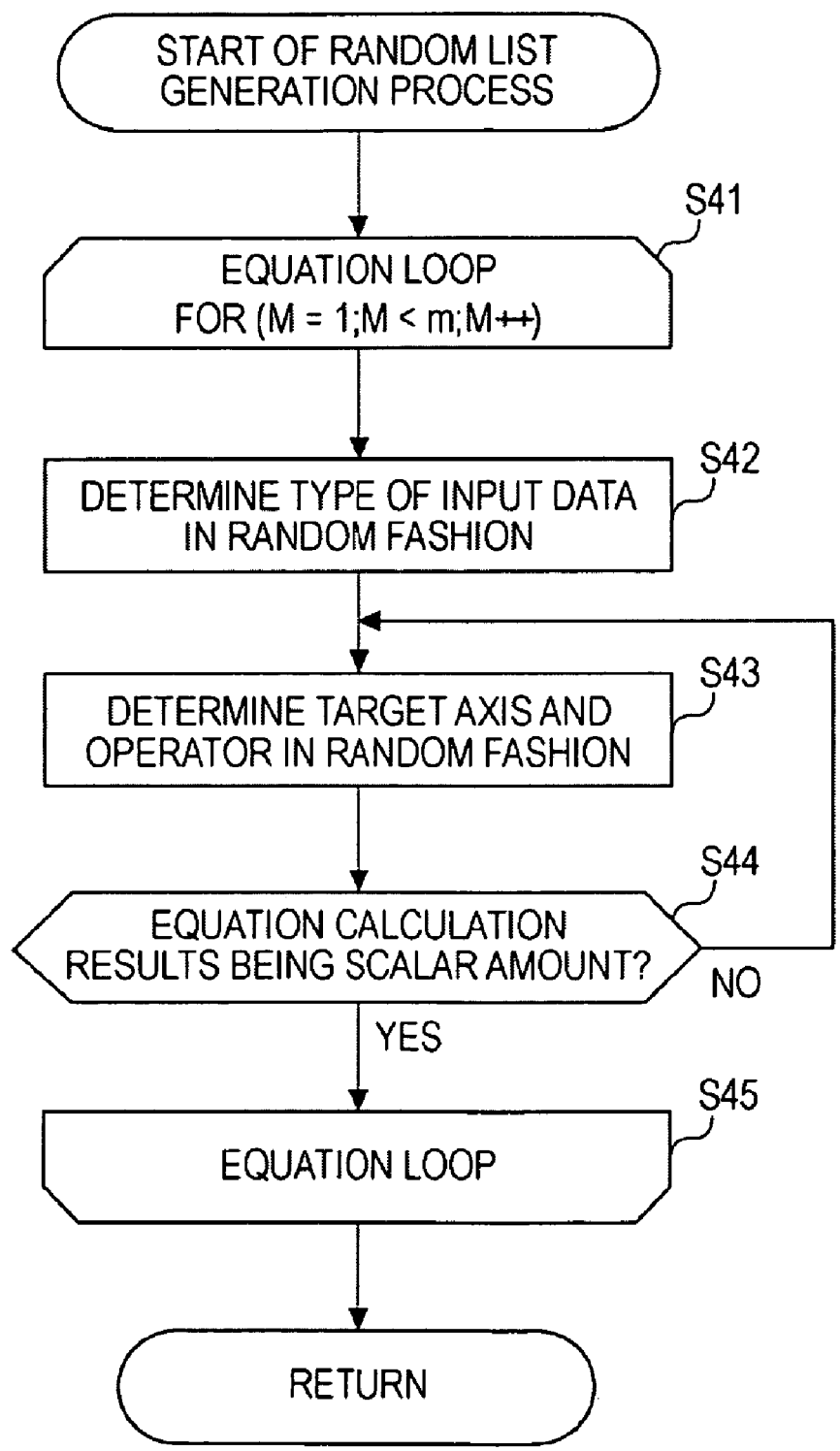
FIG. 18 is a flowchart illustrating a random list generation process.

If it is determined in step S21 that the feature extraction equation list is neither a second generation nor a later generation, i.e., the feature extraction equation list is a first generation, the feature extraction equation list generator 35 performs a random generation process of a list in step S22 to be discussed with reference to FIG. 18.

If it is determined in step S21 that the feature extraction equation list is a second generation or a later generation, the feature extraction equation list generator 35 performs in step S23 a next generation list generation process to be discussed with reference to FIG. 19.

Subsequent to step S22 or step S23, the feature extraction equation list generator 35 outputs in step S24 the feature extraction equation list generated in one of the steps S22 and S23 to the feature quantity calculator 32. Processing returns to step S2 of FIG. 16 to proceed to step S3.

All the feature extraction equations in the list are generated randomly in the first generation, and the next generation list is generated in the second generation and later generations using the genetic search method.

The random list generation process to be performed in step S22 of FIG. 17 is described below with reference to a flowchart of FIG. 18.

In step S41, the feature extraction equation list generator 35 defaults an equation loop parameter M to one, thereby starting an equation loop. The equation loop is iterated by m times, where m is the number of feature extraction equations forming the feature extraction equation list.

In step S42, the feature extraction equation list generator 35 randomly determines the input data of an M-th feature extraction equation (hereinafter referred to as feature extraction equation [M]).

In step S43, the feature extraction equation list generator 35 randomly determines a target axis of the feature extraction equation [M] to be generated and one operator.

For example, the types of operators include a mean value, fast Fourier transform (FFT), a standard deviation (StDev), a ratio of occurrence, a low-pass filter (LPF), a high-pass filter (HPF), an absolute value (ABS), an integration operation, a maximum value (MaxIndex), and an unbiased variance (UVariance). Depending on the determined operator, the target axis is fixed. In such a case, the target axis fixed to the operator is used. If an operator requiring a parameter is determined, the parameter is set to be a random value or a predetermined value.

In step S44, the feature extraction equation list generator 35 determines whether the calculation results of the feature extraction equation [M] generated heretofore are a one-dimensional scalar value. If it is determined in step S44 that the calculation results of the feature extraction equation [M] generated heretofore are not a one-dimensional scalar value, processing returns to step S43 to repeat step S43 and subsequent step to add one operator.

If it is determined in step S44 that the calculation results of the feature extraction equation [M] generated heretofore are a one-dimensional scalar value, the feature extraction equation list generator 35 determines in step S45 whether an equation loop parameter M is smaller than a maximum value m. If it is determined in step S45 that the equation loop parameter M is smaller than the maximum value m, the equation loop parameter M is incremented by one. Processing returns to step S42 to repeat step S42 and subsequent steps. If it is determined in step S45 that the equation loop parameter M is not smaller than the maximum value m (i.e., the equation loop parameter M equals the maximum value m), the feature extraction equation list generator 35 terminates the equation loop. Processing returns to step S22 of FIG. 17 to proceed to step S24.

The feature extraction equation list of the first generation is thus generated.

The next generation list generation process performed in step S23 of FIG. 17 is described below with reference to a flowchart of FIG. 19.

In step S61, the feature extraction equation list generator 35 determines values of ms, mx, mm, and mr to satisfy an equation of m=ms+mx+mm+mr (m collectively refers to the feature extraction equation) where ms represents the number of feature extraction equations for performing the selection operation (copy operation) (selection count), mx represents the number of feature extraction equations for performing the crossover operation (crossover count), mm represents the number of feature extraction equation for performing the mutation operation (mutation count), and mr represents the number of feature extraction equations for performing the random generation operation (random generation count).

The values ms, mx, mm and mr may be predetermined ratios or may be randomly determined to satisfy the equation of m=ms+mx+mm+mr.

Figure 20:
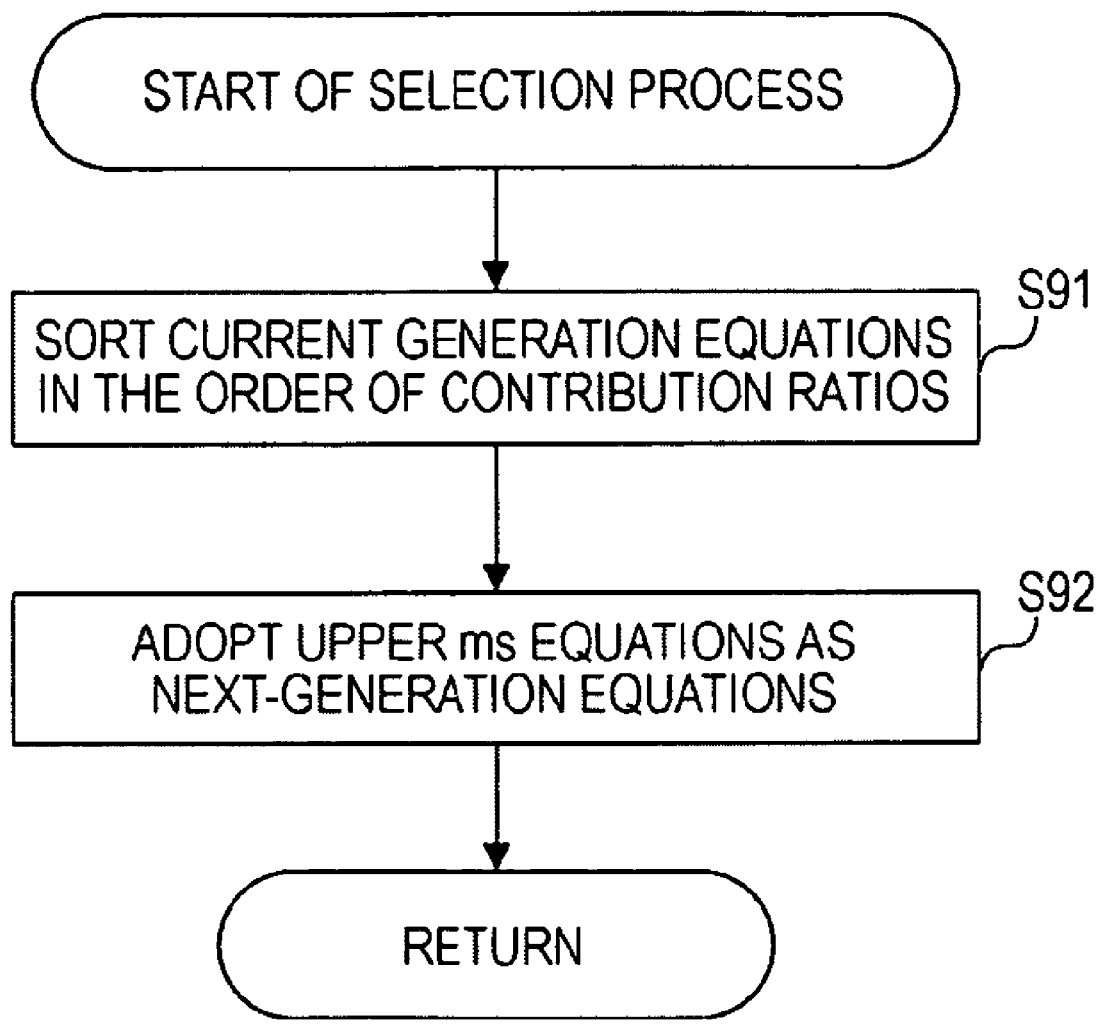
FIG. 20 is a flowchart illustrating a selection process.

In step S62, the selection process to be discussed later with reference to FIG. 20 is performed.

Figure 21:
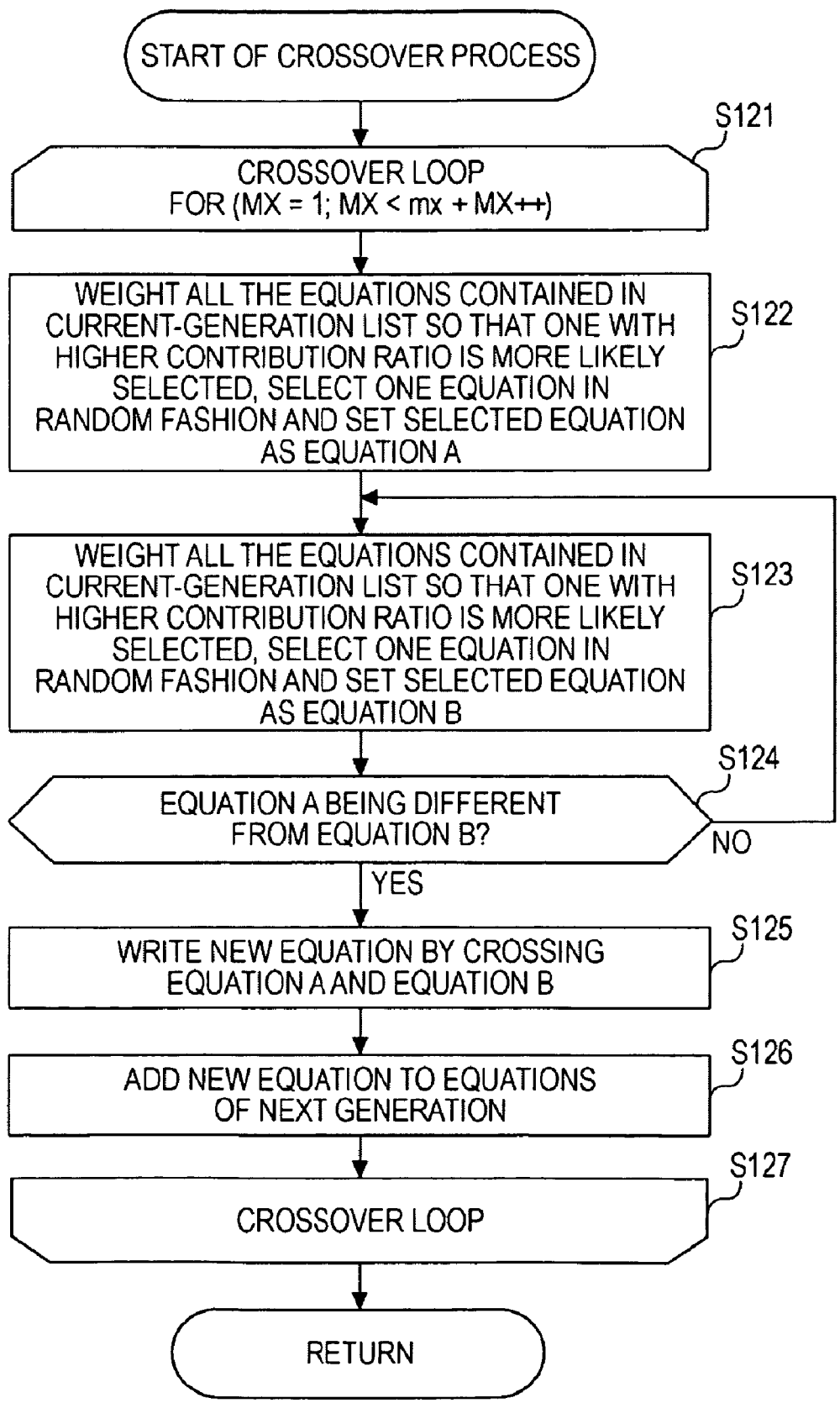
FIG. 21 is a flowchart illustrating a crossover process.

In step S63, the crossover process to be discussed with reference to FIG. 21 is performed.

Figure 22:
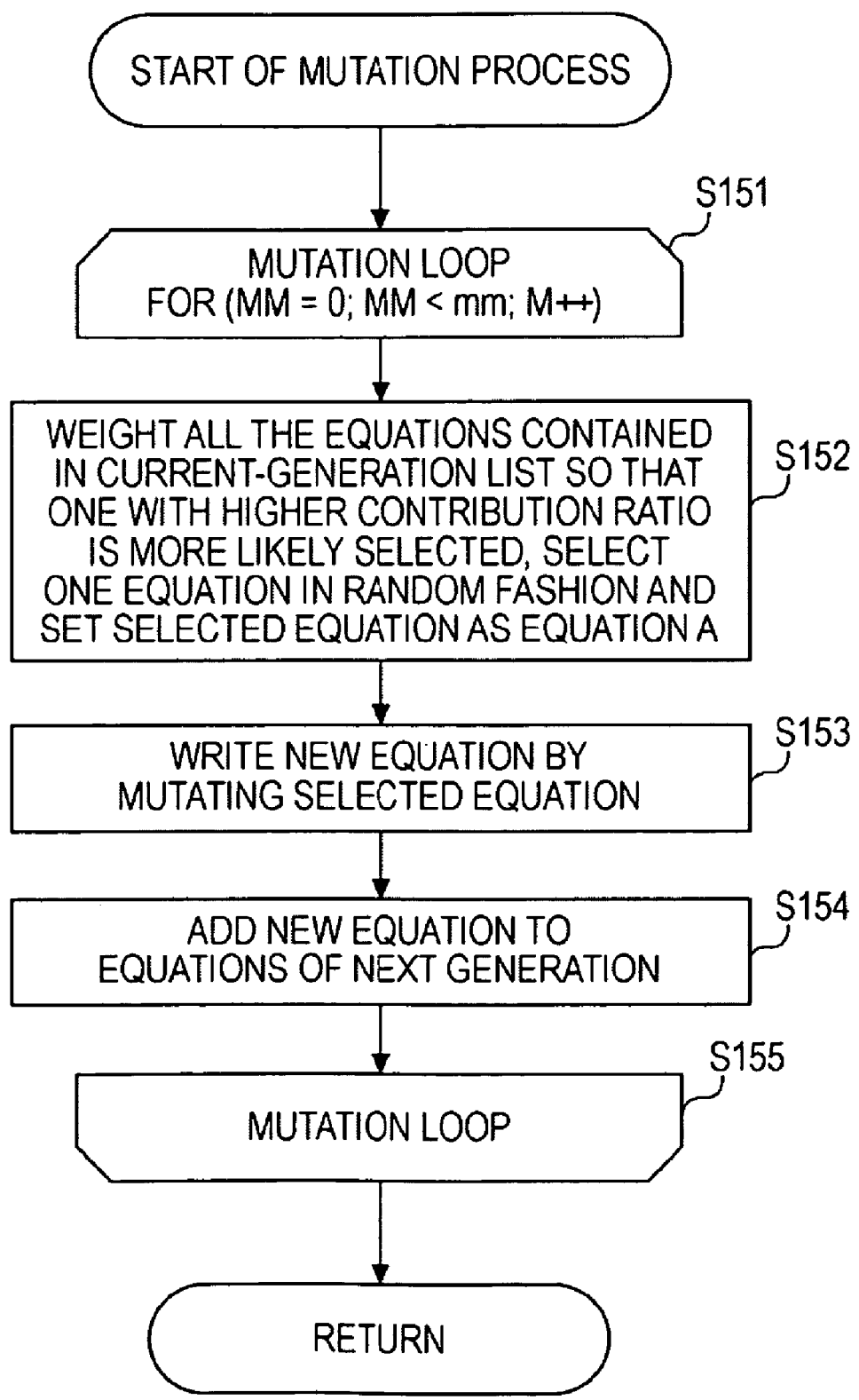
FIG. 22 is a flowchart illustrating a mutation process.

In step S64, the mutation process to be discussed with reference to FIG. 22 is performed.

Figure 23:
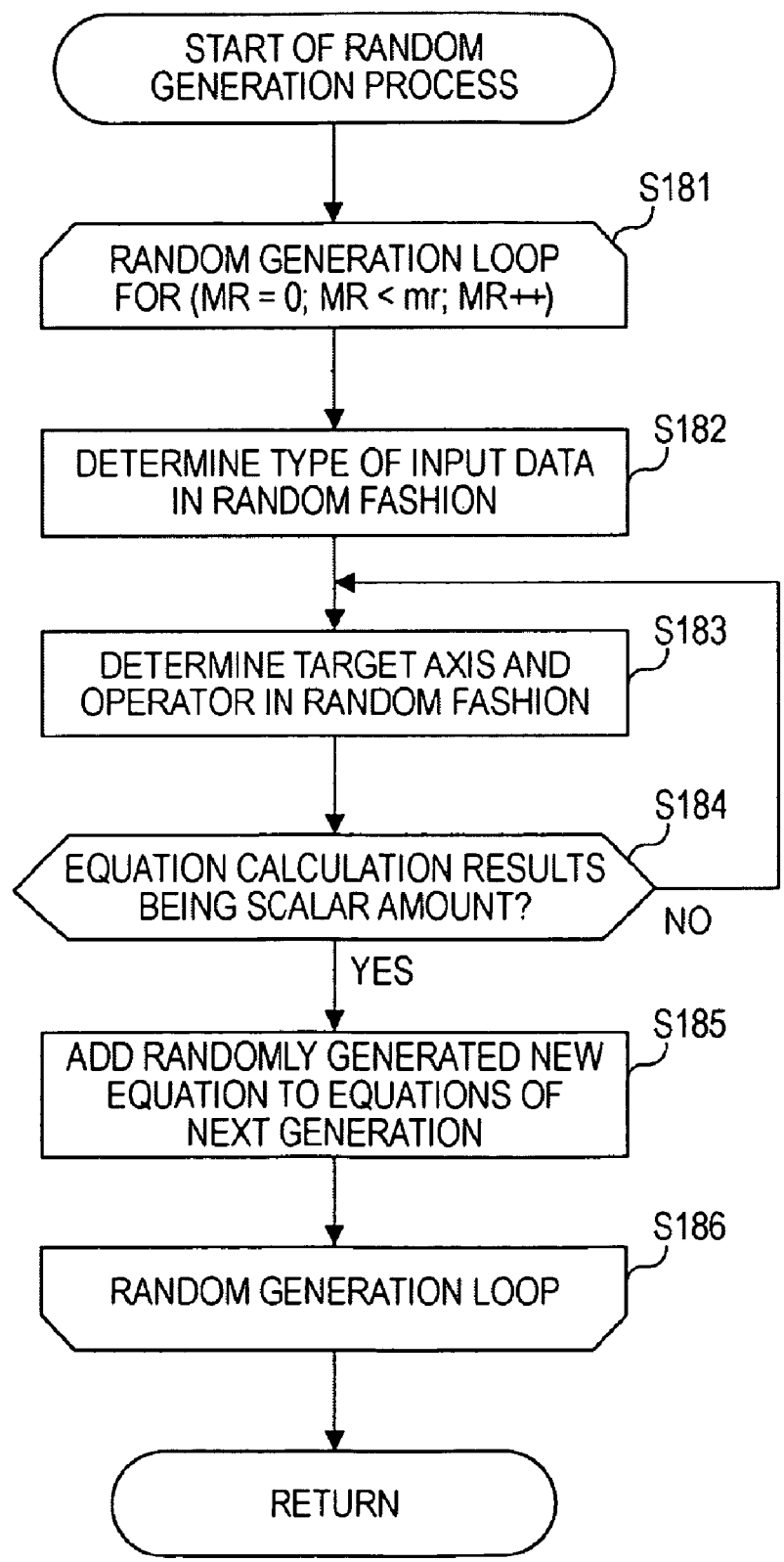
FIG. 23 is a flowchart illustrating a random generation process.

In step S65, the random generation process to be discussed with reference to FIG. 23 is performed.

Processing returns to step S23 of FIG. 17 to proceed to step S24.

Through these processes, the feature extraction equation list of the second generation is generated based on the gene search.

Figure 19:
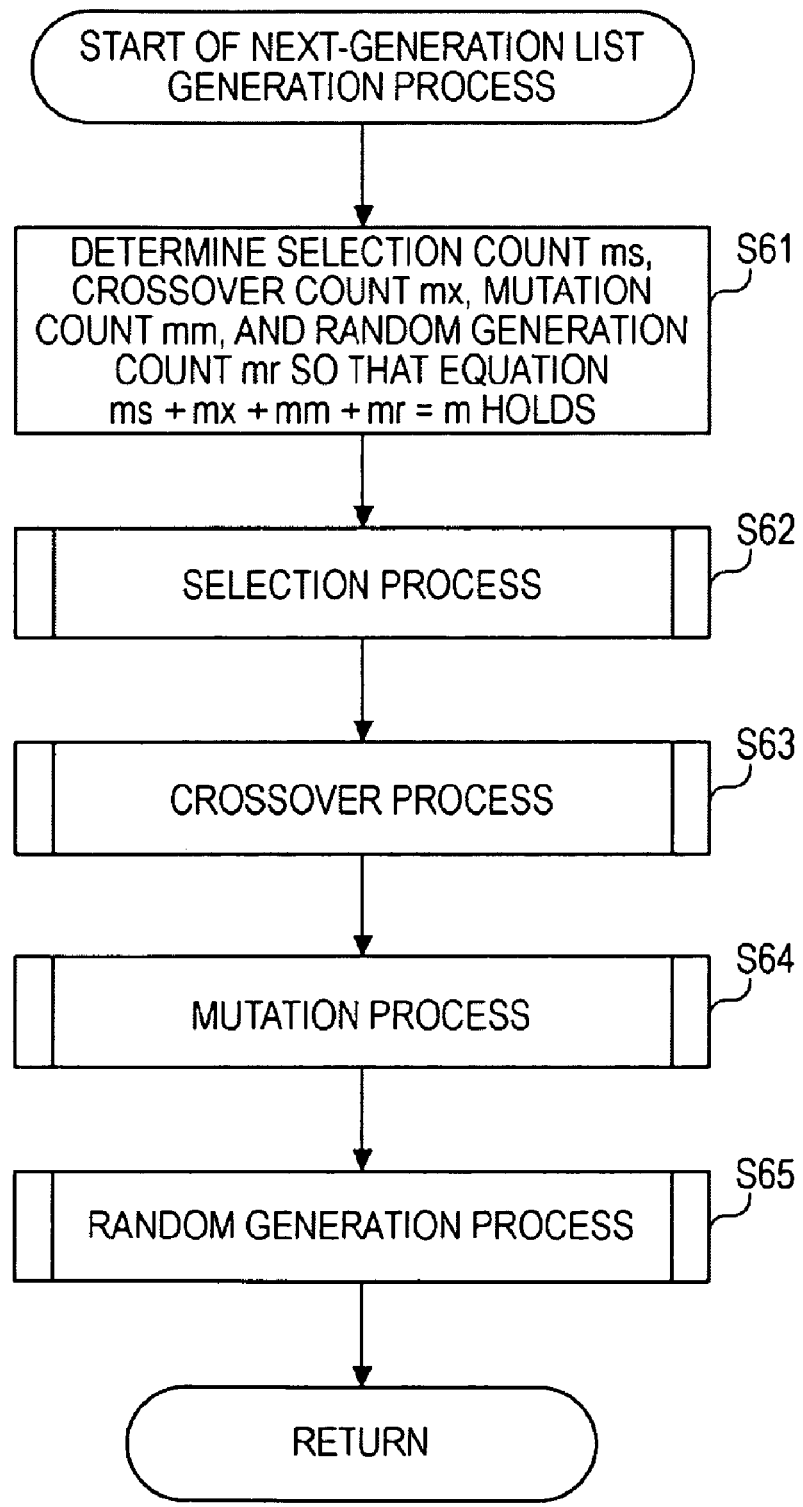
FIG. 19 is a flowchart illustrating a generation process of a next generation list.

The selection operation performed in step S62 of FIG. 19 is described below with reference to a flowchart of FIG. 20.

In step S91, the feature extraction equation list generator 35 sorts the feature extraction equations of the current generation (prior to the generation for which the feature extraction equation list is currently being generated) in accordance with the order of contribution ratios.

In step S92, the feature extraction equation list generator 35 adopts the ms feature extraction equations for the next generation. Processing returns to step S62 of FIG. 19 to proceed to step S63.

Through these steps, the feature extraction equation having a high contribution ratio is selected and copied to the feature extraction equation list of the next generation.

The crossover process performed in step S63 of FIG. 19 is described below with reference to a flowchart of FIG. 21.

In step S121, the feature extraction equation list generator 35 defaults a crossover loop parameter MX to one and then starts a crossover loop. The crossover loop is iterated by mx times with mx being equal to the crossover count mx.

In step S122, the feature extraction equation list generator 35 weights all the feature extraction equations contained in the current generation list so that a feature extraction equation having a higher contribution ratio is selected with a better chance, then randomly selects a feature extraction equation and handles the selected feature extraction equation as an equation A.

In step S123, the feature extraction equation list generator 35 weights all the feature extraction equations contained in the current generation list so that a feature extraction equation having a higher contribution ratio is selected with a better chance, then randomly selects a feature extraction equation and handles the selected feature extraction equation as an equation B.

In step S124, the feature extraction equation list generator 35 determines whether the equation A is different from the equation B. If it is determined in step S124 that the equation A is not different from the equation B, processing returns to step S123 to repeat steps S123 and S124 to select a new equation B until it is determined that the equation A is different from the equation B.

If it is determined in step S124 that the equation A is different from the equation B, the feature extraction equation list generator 35 generates in step S125 a new feature extraction equation by genetically combining part of each of the equation A and the equation B.

The feature extraction equation list generator 35 combines parts of the two equations in a combination so that a scalar quantity is determined from input data by calculating the feature extraction equation subsequent to the combination, i.e., in a combination so that no inconsistency is caused in the target axes if the calculation process is performed on the feature extraction equations starting with the leading feature extraction equation.

In step S126, the feature extraction equation list generator 35 adds the new feature extraction equation generated in step S125 to the equations of the next generation.

In step S127, the feature extraction equation list generator 35 determines whether a crossover loop parameter MX is smaller than a crossover count mx that is a maximum value. If it is determined in step S127 that the crossover loop parameter MX is smaller than the crossover count mx, the crossover loop parameter MX is incremented by one. Processing returns to step S122 to repeat step S122 and subsequent steps. If it is determined in step S127 that the crossover loop parameter MX is not smaller than the crossover count mx, i.e., the crossover loop parameter MX equals the crossover count mx, the feature extraction equation list generator 35 terminates the crossover loop. Processing returns to step S63 of FIG. 19 to proceed to step S64.

Each time the crossover loop from step S122 through step S126 is performed, one of the feature extraction equations (genes) contained in the feature extraction equation list of the next generation is generated. When the crossover loop is completed, mx of the feature extraction equations (genes) contained in the feature extraction equation list have been generated.

The feature extraction equations are thus weighted in this way so that a feature extraction equation having a higher contribution, ratio is selected with a better chance, and then one feature extraction equation is selected. Using the selected feature extraction equation, the feature extraction equation list generator 35 performs the crossover operation, thereby generating the feature extraction equation contained in the feature extraction equation list of the next generation.

The mutation operation performed in step S64 of FIG. 19 is described below with reference to a flowchart of FIG. 22.

In step S151, the feature extraction equation list generator 35 defaults a mutation loop parameter MM to one, and then starts a mutation loop. The mutation loop is iterated by mm times with mm being equal to the mutation count mm.

In step S152, the feature extraction equation list generator 35 weights all the feature extraction equations contained in the current generation list so that a feature extraction equation having a higher contribution ratio is selected with a better chance and then randomly selects one feature extraction equation as equation A.

In step S153, the feature extraction equation list generator 35 generates a new feature extraction equation by performing the mutation operation. More specifically, through the mutation operation, the feature extraction equation list generator 35 modifies or deletes part of the selected equation A, or modifies an internal parameter of the equation A.

The feature extraction equation list generator 35 modifies part of the feature extraction equation in a manner such that a scalar quantity is determined from input data by calculating the feature extraction equation subsequent to the modification of the part of the feature extraction equation, i.e., in a manner such that no inconsistency is caused in the processing axes if the calculation process is performed on the feature extraction equations starting with the leading feature extraction equation.

In step S154, the feature extraction equation list generator 35 adds the new feature extraction equation generated in step S153 to the feature extraction equation of the next generation.

In step S155, the feature extraction equation list generator 35 determines whether the mutation loop parameter MM is smaller than the mutation count mm. If it is determined in step S155 that the mutation loop parameter MM is smaller than the mutation count mm, the feature extraction equation list generator 35 increments the mutation loop parameter MM by one. Processing returns to step S152 to repeat step S152 and subsequent steps. If it is determined in step S155 that the mutation loop parameter MM is not smaller than the mutation count mm, i.e., the mutation loop parameter MM equals the mutation count mm, the feature extraction equation list generator 35 terminates the mutation loop. Processing returns to step S64 of FIG. 19 to proceed to step S65.

Each time the mutation loop of step S152 through step S154 is performed, one of the feature extraction equations (genes) to be contained in the feature extraction equation list of the next generation is generated. When the mutation loop is completed, mm of the feature extraction equations (genes) contained the feature extraction equation list have been generated.

The feature extraction equations are thus weighted in this way so that a feature extraction equation having a higher contribution ratio is selected with a better chance, and then one feature extraction equation is selected. Using the selected feature extraction equation, the feature extraction equation list generator 35 performs the mutation operation, thereby generating the feature extraction equation contained in the feature extraction equation list of the next generation.

The random generation process performed in step S65 of FIG. 19 is described below with reference to a flowchart of FIG. 23.

In step S181, the feature extraction equation list generator 35 defaults a random generation loop parameter MR to one and then starts a random generation loop. The random generation loop is iterated by mr times with mr being equal to the number of feature extraction equations in the feature extraction equation list.

In step S182, the feature extraction equation list generator 35 randomly selects input data corresponding to a MR-th feature extraction equation (hereinafter also referred to as a feature extraction equation MR) from among a plurality of pieces of learning input data.

In step S183, the feature extraction equation list generator 35 randomly determines the target axis of the feature extraction equation MR to be generated and one operation.

For example, the types of operators include a mean value, fast Fourier transform (FFT), a standard deviation (StDev), a ratio of occurrence, a low-pass filter (LPF), a high-pass filter (HPF), an absolute value (ABS), an integration operation, a maximum value (MaxIndex), and an unbiased variance (UVariance). Depending on the determined operator, the processing target axis is fixed. In such a case, the processing target axis fixed to the operator is used. If an operator requiring a parameter is determined, the parameter is set to be a random value or a predetermined value.

In step S184, the feature extraction equation list generator 35 determines whether the calculation results of the feature extraction equation MR generated heretofore are a one-dimensional scalar value. If it is determined in step S184 that the calculation results of the feature extraction equation MR generated heretofore are not a one-dimensional scalar value, processing returns to step S183 to repeat step S183 and subsequent step to add one operator.

If it is determined in step S184 that the calculation results of the feature extraction equation MR generated heretofore are a one-dimensional scalar value, the feature extraction equation list generator 35 determines in step S185 whether a random generation loop parameter MR is smaller than a maximum value mr. If it is determined in step S185 that the random generation loop parameter is smaller than the maximum value mr, the random generation loop parameter is incremented by one. Processing returns to step S182 to repeat step S182 and subsequent steps. If it is determined in step S185 that the random generation loop parameter is not smaller than the maximum value mr (i.e., the random generation loop parameter equals the maximum value mr), the feature extraction equation list generator 35 terminates the random generation loop. Processing returns to step S65 of FIG. 19 and then returns to step S23 of FIG. 17 to proceed to step S24.

Each time the random generation loop from step S182 through step S185 is performed, one of the feature extraction equations (genes) contained in the feature extraction equation list of the next generation is generated. When the random generation loop is completed, mr of the feature extraction equations (genes) contained in the feature extraction equation list have been generated.

The random generation process generates parts of the feature extraction equations contained of the feature extraction equation list of the next generation.

The feature quantity calculation process performed in step S3 of FIG. 16 is described below with reference to a flowchart of FIG. 24.

In step S211, the feature quantity calculator 32 acquires from the feature extraction equation list generator 35 the feature extraction equation list, defaults an equation loop parameter M to one, and starts an equation loop. The equation loop is iterated by m times with m being the number of feature extraction equations forming the feature extraction equation list.

In step S212, the feature quantity calculator 32 defaults a content loop parameter Q to one and then starts a content loop. The content loop is iterated by q times with q being the number of pieces of learning data acquired by the learning content data acquisition unit 31.

In step S213, the feature quantity calculator 32 calculates a feature quantity of the learning data corresponding to a content loop parameter Q using the feature extraction equation of the equation loop parameter M.

In step S214, the feature quantity calculator 32 determines whether the content loop parameter Q is smaller than a maximum value q. If it is determined in step S214 that the content loop parameter Q is smaller than the maximum value q, the content loop parameter Q is incremented by one. Processing returns to step S213 to repeat step S213 and subsequent steps.

If it is determined in step S214 that the content loop parameter Q is not smaller than a maximum value q (i.e., the content loop parameter Q equals the maximum value q), the feature quantity calculator 32 terminates the content loop. Processing proceeds to step S215.

In step S215, the feature quantity calculator 32 determines whether an equation loop parameter M is smaller than the maximum value m. If it is determined in step S215 that the equation loop parameter M is smaller than the maximum value m, the equation loop parameter M is incremented by one. Processing returns to step S212 to repeat step S212 and subsequent steps. If it is determined in step S215 that the equation loop parameter M is not smaller the maximum value m (i.e., the equation loop parameter M equals the maximum value m), the feature quantity calculator 32 terminates the equation loop. Processing returns to step S3 of FIG. 16 to proceed to step S4.

The feature quantity used in each of the feature extraction equations is thus calculated. The feature quantities calculated here are not used as the evaluation values to advance the feature extraction equation in generation. The evaluation value to advance the feature extraction equation in generation is not the feature quantity calculated here but the contribution ratio of the corresponding feature extraction equation determined using the feature quantity.

The machine learning process performed in step S4 of FIG. 16 is described below with reference to a flowchart of FIG. 25.

In step S241, the machine learning unit 34 defaults a supervisor loop parameter K to one and then starts a supervisor loop. The supervisor loop is iterated by k times with k being the number of pieces of supervisor data acquired by the supervisor data acquisition unit 33.

Figure 26:
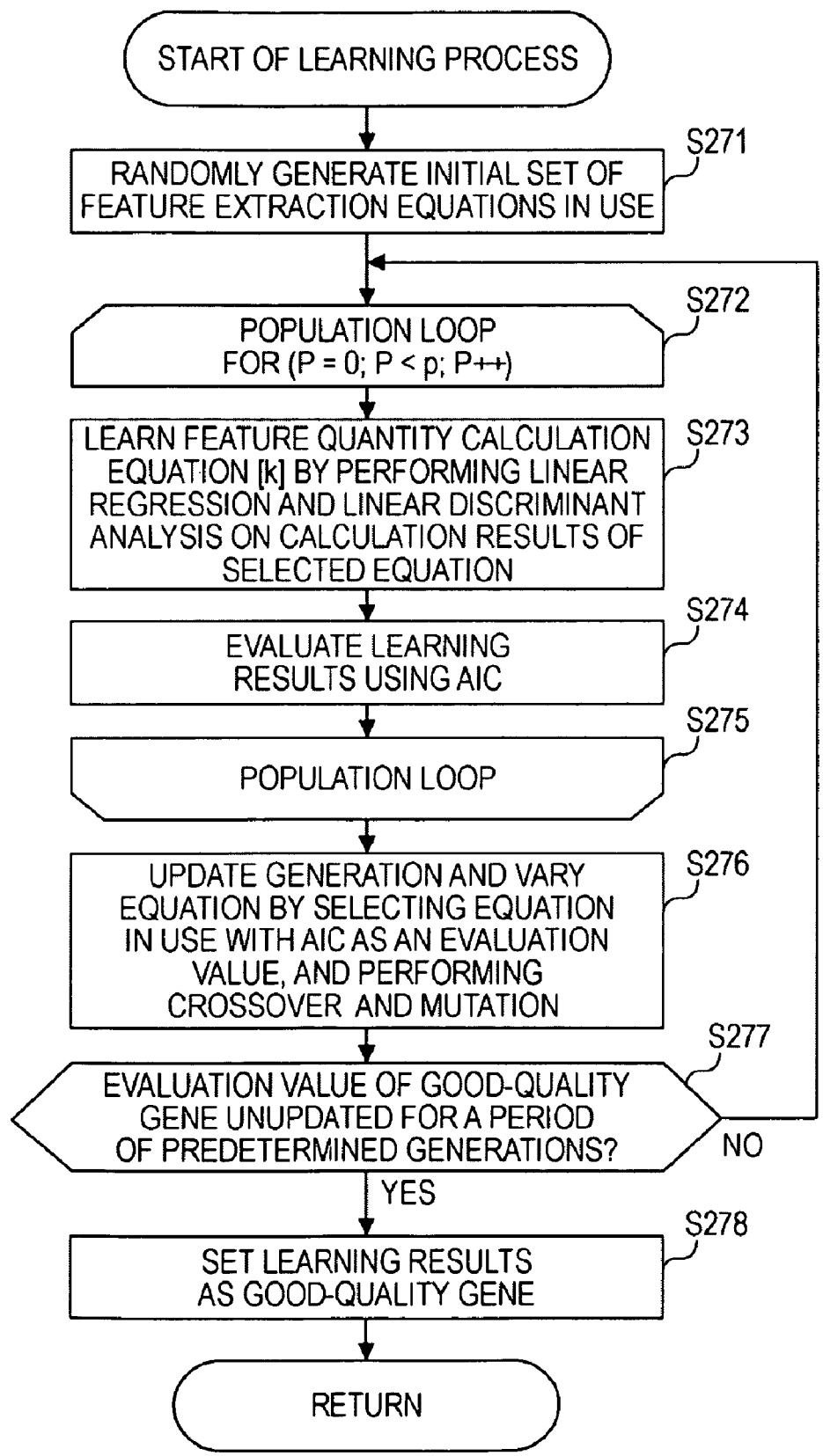
FIG. 26 is a flowchart illustrating a learning process.

In step S242, a learning process to be discussed with reference to FIG. 26 is performed.

In step S243, the machine learning unit 34 determines whether a supervisor loop parameter K is smaller than a maximum value k. If it is determined in step S243 that the supervisor loop parameter K is smaller than the maximum value k, the supervisor loop parameter K is incremented by one. Processing returns to step S242 to repeat step S242 and subsequent steps. If it is determined in step S243 that the supervisor loop parameter K is not smaller than the maximum value k (i.e., the supervisor loop parameter K equals the maximum value k), the machine learning unit 34 terminates the supervisor loop. Processing proceeds to step S244.

A contribution ratio calculation process to be discussed with reference to FIG. 27 later is performed in step S244. Processing returns to step S4 of FIG. 16 to proceed to step S5.

The learning process performed in step S242 of FIG. 25 is described below with reference to a flowchart of FIG. 26.

In step S271, the machine learning unit 34 randomly generates an initial set of feature extraction equations to be used to generate the feature quantity calculation equation. More specifically, the machine learning unit 34 randomly generates the initial set of a plurality of genes. The gene here determines whether to use each feature extraction equation (i.e., whether a combination coefficient in the feature quantity calculation equation has a predetermined value or not, in other words, whether the combination coefficient in the feature quantity calculation equation is zero or not).

In step S272, the machine learning unit 34 defaults a population loop parameter P to one and then starts a population loop. The population loop is iterated by p times with p being the number of genes contained in the initial set.

In step S273, the machine learning unit 34 learns the feature quantity calculation equation [k] (every k feature extraction equations of k target problems) through linear regression/discriminant analysis. In the learning process, the machine learning unit 34 uses calculation results of a feature extraction equation selected as a feature extraction equation to be used, from among the calculation results of the feature quantity supplied from the feature quantity calculator 12. In other words, the machine learning unit 34 uses the feature quantity resulting from the selected feature extraction equation.

In step S274, the machine learning unit 34 evaluates the learning results in step S273 using AIC.

In step S275, the machine learning unit 34 determines whether a population loop parameter P is smaller than a maximum value p. If it is determined in step S275 that the population loop parameter P is smaller than the maximum value p, the population loop parameter P is incremented by one. Processing returns to step S273 to repeat step S273 and subsequent steps. If it is determined in step S275 that the population loop parameter P is not smaller than the maximum value p (i.e., the population loop parameter P equals the maximum value p), the machine learning unit 34 terminates the population loop.

In step S276, the machine learning unit 34 selects a feature extraction equation to be used, with AIC being as a evaluation value, and performs the crossover and mutation operations. The generation thus advances and feature extraction equations are changed.

In step S277, the machine learning unit 34 determines whether the evaluation value of the best gene is updated for a predetermined number of generations. If it is determined in step S277 that the evaluation value of the best gene is updated or that a predetermined number of generations has not advanced since the last updating of the evaluation value, processing returns to step S272 to repeat step S272 and subsequent steps.

If it is determined in step S277 that the evaluation value of the best gene has not been updated for the predetermined generations, the machine learning unit 34 outputs the best gene as the learning results. Processing returns to step S242 to proceed to step S243.

The genetic search method using as the gene the combination of feature extraction equations to be used/unused determines a combination of the feature extraction equations to be used in the feature quantity calculation equation.

In the above discussion, the genetic search method and AIC are used in the machine learning. The machine learning may be performed using a different method. The output value of each feature extraction equation to be used/unused may be determined using the neighbor search method instead of the genetic algorithm.

The contribution ratio calculation process performed in step S244 of FIG. 25 is described below with reference to a flowchart of FIG. 27.

In step S301, the machine learning unit 34 defaults an equation loop parameter M to one and starts an equation loop. The equation loop is iterated by m with m being the number of feature extraction equations forming the feature extraction equation list.

In step S302, the machine learning unit 34 calculates a standard deviation StDev[M] of all the learning input data provided for learning in accordance with the feature extraction equation [M].

In step S303, the machine learning unit 34 determines whether an equation loop parameter M is smaller than a maximum value m. If it is determined in step S303 that the equation loop parameter M is smaller than the maximum value m, the equation loop parameter M is incremented by one. Processing returns to step S301 to repeat step S301 and subsequent steps. If it is determined in step S303 that the equation loop parameter M is not smaller than the maximum value m (i.e., the equation loop parameter M equals the maximum value m), the machine learning unit 34 terminates the equation loop.

In step S304, the machine learning unit 34 defaults to zero an overall contribution ratio Cont[M] that is the sum of contribution ratios of the feature extraction equations corresponding to all the types of supervisors.

In step S305, the feature extraction equation list generator 35 defaults a supervisor loop parameter K to one and then starts a supervisor loop. The supervisor loop is iterated by k times with k being the number of pieces of supervisor data acquired by the supervisor data acquisition unit 33.

In step S306, the machine learning unit 34 defaults an equation loop parameter M to one and then starts an equation loop. The equation loop is iterated by m times with m being the number of feature extraction equations forming the feature extraction equation list.

In step S307, the machine learning unit 34 calculates a contribution ratio $(X_M)$ of a feature extraction equation using the previously described equation (3). The feature extraction equation here is used to estimate target metadata Y (indicating tempo and merriness, for example) responsive to a supervisor loop parameter K.

In step S308, the machine learning unit 34 determines whether an equation loop parameter M is smaller than a maximum value m. If it is determined in step S308 that the equation loop parameter M is smaller than the maximum value m, the equation loop parameter M is increment by one. Processing returns to step S307 to repeat step S307 and subsequent steps. If it is determined in step S308 that the equation loop parameter M is not smaller than the maximum value m (i.e., the equation loop parameter M equals the maximum value m), the machine learning unit 34 terminates the equation loop.

In step S309, the machine learning unit 34 determines whether a supervisor loop parameter K is smaller than a maximum value k. If it is determined in step S309 that the supervisor loop parameter K is smaller than the maximum value k, the supervisor loop parameter K is incremented by one. Processing returns to step S306 to repeat step S306 and subsequent steps. If it is determined in step S309 that the supervisor loop parameter K is not smaller than the maximum value k (i.e., the supervisor loop parameter K equals the maximum value k), the machine learning unit 34 terminates the supervisor loop.

In step S310, the machine learning unit 34 outputs an overall contribution ratio Cont[M] that is the sum of contribution ratio $(X_M)$ of the feature extraction equation of all the supervisor data. Processing returns to step S244 of FIG. 25 and then to step S4 of FIG. 16 to proceed to step s5.

The contribution ratio of the feature extraction equation in the feature quantity calculation equation to solve the target problem is thus determined. The contribution ratio is used as an evaluation value to advance in generation in the genetic search method generating the feature quantity extraction algorithm.

Through the processes of FIGS. 16 through 27, the algorithm generator 11 generates the feature quantity extraction algorithm, and then supplies the generated feature quantity extraction algorithm to the feature quantity calculator 12 arranged in the same apparatus (information processing apparatus 1) or in a different apparatus. In accordance with the feature quantity extraction algorithm, the feature quantity calculator 12 analyzes the detection data supplied for the detection of the feature quantity and calculates and outputs the feature quantity.

Figure 28:
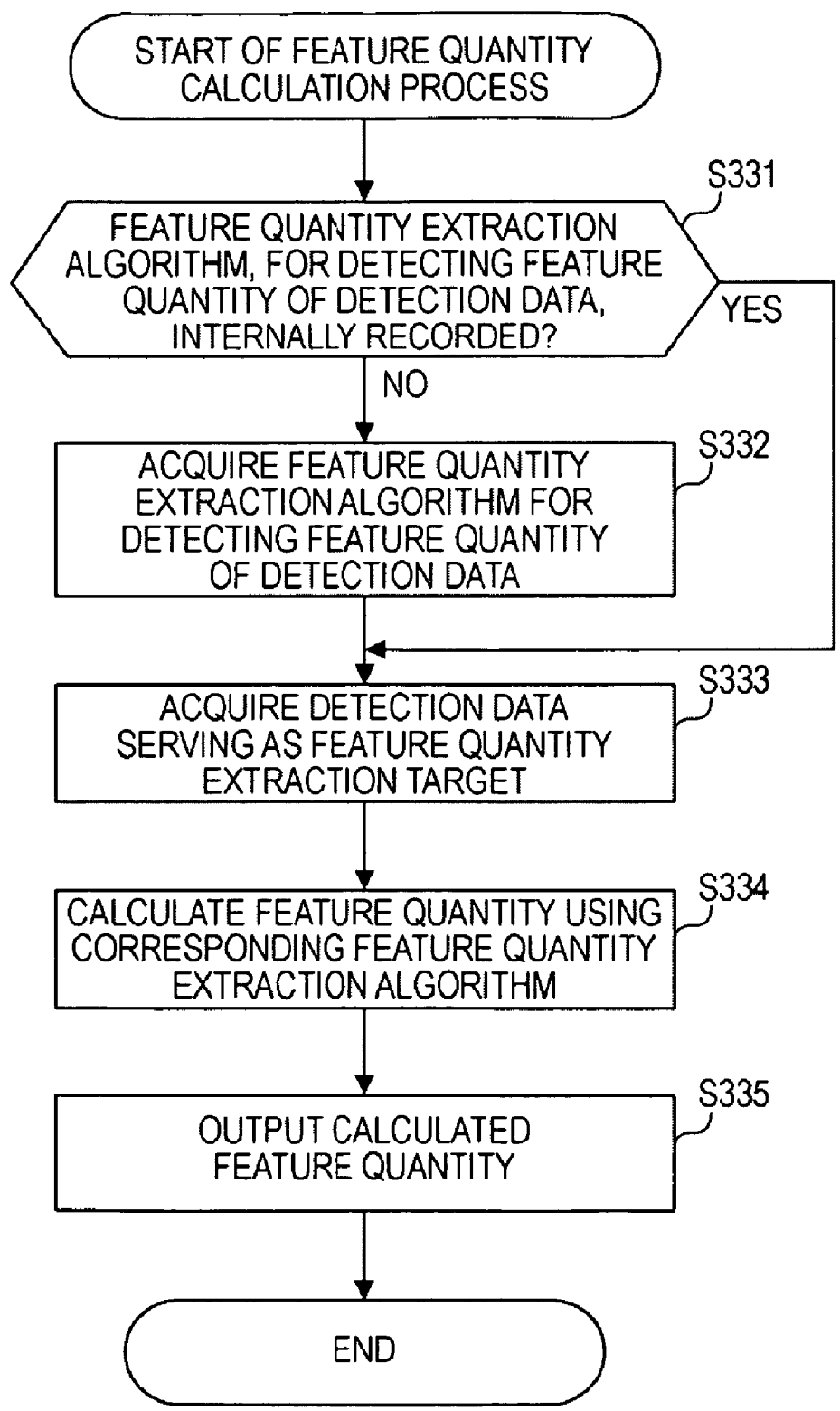
FIG. 28 is a flowchart illustrating a feature quantity calculation process.

The feature quantity calculation process performed by the feature quantity calculator 12 is described below with reference to a flowchart of FIG. 28.

In step S331, the feature quantity arithmetic unit 53 in the feature quantity calculator 12 determines whether the feature quantity extraction algorithm for detecting the feature quantity of the detection data is stored therewithin.

If it is determined in step S331 that the feature quantity extraction algorithm is not stored, the feature quantity extraction algorithm acquisition unit 51 acquires the feature quantity extraction algorithm for detecting the feature quantity of the detection data and then supplies the acquired feature quantity extraction algorithm to the feature quantity arithmetic unit 53. The feature quantity extraction algorithm for detecting the feature quantity of the detection data is the one the algorithm generator 11 has generated using the learning data corresponding to the detection data, and the supervisor data.

Subsequent to the determination in step S331 that the feature quantity extraction algorithm is stored internally, or subsequent to step S332, the detection content data acquisition unit 52 acquires, in step S333, the detection data as a feature quantity extraction target and supplies the detection data to the feature quantity arithmetic unit 53.

In step S334, the feature quantity arithmetic unit 53 calculates the feature quantity as a solution to the target problem in the detection data as the feature quantity extraction target supplied from the detection content data acquisition unit 52, using the corresponding feature quantity extraction algorithm. The feature quantity arithmetic unit 53 then supplies the resulting feature quantity to the result output unit 54.

In step S335, the result output unit 54 outputs the feature quantity calculated in step S334 by the feature quantity arithmetic unit 53 to notify the user of the feature quantity. For example, the result output unit 54 outputs the feature quantity to an external device, displays the feature quantity in the form of text data, or outputs audio data in the form of an audio responsive to the solution.

In this way, the target problem is solved using all the genes, the contribution ratio at which each gene has contributed to the solution to the target problem is calculated, and the gene search performed using the contribution ratio as the evaluation value results in the feature quantity extraction algorithm. A similar problem to desired input data is thus solved.

The feature quantity extraction algorithm for solving the target problem is generated by the information processing apparatus 1 of FIG. 3 or by an information processing system including the algorithm generator 11 and the feature quantity calculator 12 as separate apparatuses. To generate the feature quantity extraction algorithm, a predetermined number of feature extraction equations (genes) of the first generation is generated, and all the feature extraction equations are calculated using all the learning content data. Using the calculation results of all the feature extraction equations, the machine learning is performed to determine the feature quantity calculation equation for extracting the target feature quantity (the solution to the target problem). The contribution ratio of each feature extraction equation in the feature quantity calculation equation is also calculated. The genetic search method is performed using the contribution ratio of each feature extraction equation as the evaluation value and the plurality of feature extraction equations of the current generation as the genes of the current generation. The genes of the next generation, namely, the feature extraction equations of the next generation thus result. With the generations advancing, the feature quantity extraction algorithm determining the solution to the target problem at a predetermined accuracy level is thus provided.

Instead of finding a single excellent gene capable of solving the target problem, the algorithm generator 11 efficiently searches for a plurality of genes that solve the target problem in cooperation with each other. A feature quantity extractor for automatically extracting a plurality of feature quantities from the content data is thus automatically constructed.

When the target problem is solved using a set of a plurality of genes instead of a single gene, the use of a plurality of feature extraction equation lists as disclosed in International Publication No. WO2007/049641 is not necessary. In this way, the plurality of genes that solve the target problem in cooperation with each other are searched efficiently with a smaller number of arithmetic operations.

The method steps described above may be performed using hardware or software. If software is used, the above-described method steps are performed by a personal computer 500 of FIG. 29.

Figure 29:
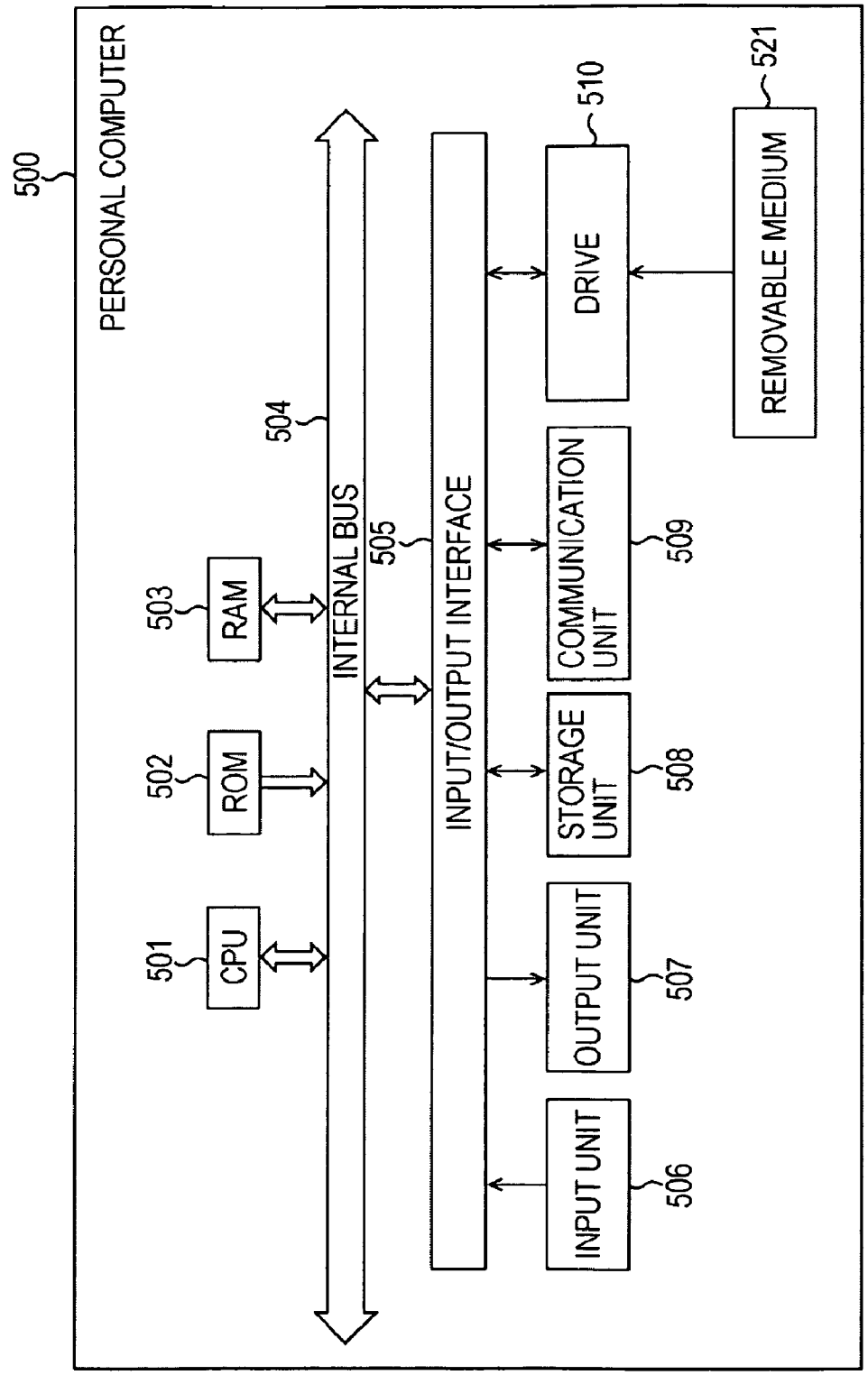
FIG. 29 is a block diagram illustrating a personal computer.

As shown in FIG. 29, a central processing unit (CPU) 501 executes a program stored on a read-only memory (ROM) 502 or a program loaded from a storage unit 508 to a random-access memory (RAM) 503. As necessary, the RAM 503 stores data that the CPU 501 needs to execute a variety of processes.

The CPU 501, the ROM 502, and the RAM 503 are interconnected to each other via an internal bus 504. The internal bus 504 is also connected to an input-output interface 505.

The input-output interface 505 connects to an input unit 506 including a keyboard and a mouse, an output unit 507 including a display such as a cathode-ray tube (CRT) or a liquid-crystal display (LCD), and a loudspeaker, the storage unit 508 including a hard disk, and a communication unit 509 including a modem and a terminal adaptor. The communication unit 509 performs a communication process via a variety of networks including a telephone line and a cable-television (CATV) network.

A drive 510 is also connected to the input-output interface 505 as necessary. The drive 510 is loaded with a removable medium 521, such as a magnetic disk, an optical disk, a magneto-optical disk, or a semiconductor memory, as appropriate. A computer program read from a removable medium 521 is installed onto the storage unit 508 as necessary.

The method steps describing the program recorded on the recording medium are performed in the time-series order described above. Alternatively, the method steps may be performed in parallel or separately instead of being performed in the time-series order described above.

The term system in the context of the specification refers to an entire arrangement including a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a memory device storing instructions; and
a processor executing the instructions for:
acquiring a target problem;
generating a plurality of solution candidates to the target problem to solve the target problem;
generating a list including first generation data calculation equations;
determining a linear combination coefficient ($B_M$) based on the first generation data calculation equations;
determining a first standard deviation value (StDev ($X_M$)) and a second standard deviation value (StDev ($T_M$));
determining a correlation coefficient value (Correl($X_M$, $T_M$));
calculating a contribution ratio (Ratio) of each solution candidate to the target problem if the target problem is solved using all the plurality of solution candidates, the calculation being performed by using the equation:

$$\text{Ratio} = \frac{B_M}{StDev(X_M)} \times St(Dev(T_M)) \times Correl(X_M, T_M); \text{ and}$$

generating an iterative solution candidate to the target problem in a next generation in accordance with a genetic algorithm that uses an evaluation value that is calculated using at least the contribution ratio of each solution candidate to the target problem.

2. The information processing apparatus according to claim 1, wherein the processor further executes the instructions for:
acquiring learning data; and
acquiring as supervisor data a solution to the target problem corresponding to the learning data.

3. The information processing apparatus according to claim 2, wherein the processor further executes the instructions for:
performing a calculation operation on the learning data based on the first generation data calculation equations, and;
applying a calculation result from the calculation operation to a feature quantity calculation equation, the feature quantity calculation equation being used to estimate the supervisor data, wherein the supervisor data is a linear combination of output values based on the first generation data calculation equations; and
generating second generation data calculation equations based on a genetic algorithm, the genetic algorithm using an evaluation value.

4. The information processing apparatus according to claim 3, further comprising:
an output device for outputting the feature quantity calculation equation and the second generation data calculation equations.

5. The information processing apparatus according to claim 3, further comprising:
an output device for outputting the feature quantity calculation equation when calculation results of the feature quantity calculation equation are greater than or equal to a predetermined accuracy.

6. The information processing apparatus according to claim 3, wherein the processor further executes the instructions for:
estimating the supervisor data using the feature quantity calculation equation based on a linear combination coefficient with a gene indicating in the feature quantity calculation equation whether the linear combination coefficient of the data calculation equation is zero or not.

7. the information processing apparatus according to claim 3, wherein the processor further executes the instructions for:
Acquiring detection data; and
calculating a feature quantity of the detection data by using the feature quantity calculation equation, and the second generation data calculation equations.

8. An information processing method for determining a solution to a target problem, the information processing method being executed on a computer and comprising steps of:

acquiring a target problem;
generating a plurality of solution candidates to the target problem to solve the target problem;
generating a list including first generation data calculation equations;
determining a linear combination coefficient ($B_M$) based on the first generation data calculation equations;
determining a first standard deviation value ($StDev(X_M)$) and a second standard deviation value ($StDev(T_M)$);
determining a correlation coefficient value ($Correl(X_M, T_M)$);
calculating, by using a processor of the computer, a contribution ratio (Ratio) of each solution candidate to the target problem if the target problem is solved using all the plurality of solution candidates, the calculation being performed by using the equation:

$$\text{Ratio} = \frac{B_M}{StDev(X_M)} \times St(Dev(T_M)) \times Correl(X_M, T_M); \text{ and}$$

generating, by using the processor, an iterative solution candidate to the target problem in a next generation in accordance with a genetic algorithm that uses an evaluation value that is calculated using at least the contribution ratio of each solution candidate to the target problem.

9. The information processing method according to claim 8, further comprising steps of:
acquiring learning data; and
acquiring as supervisor data a solution to the target problem corresponding to the learning data.

10. The information processing method according to claim 9, further comprising steps of:
performing a calculation operation on the learning data using the first generation data calculation equations;
applying a calculation result from the calculation operation to a feature quantity calculation equation, the feature quantity calculation equation being used to estimate the supervisor data, wherein the supervisor data is a linear combination of output values based on the first generation data calculation equations; and
generating second generation data calculation equations based on a genetic algorithm, the genetic algorithm using an evaluation value.

11. The information processing method according to claim 10, further comprising steps of outputting the feature quantity calculation equation and the second generation data calculation equations.

12. The information processing method according to claim 10, further comprising steps of outputting the feature quantity calculation equation when calculation results of the feature quantity calculation equation are greater than or equal to a predetermined accuracy.

13. The information processing method according to claim 10, further comprising steps of estimating the supervisor data using the feature quantity calculation equation based on a linear combination coefficient with a gene indicating in the feature quantity calculation equation whether the linear combination coefficient of the data calculation equation is zero or not.

14. The information processing method according to claim 10, further comprising steps of:
acquiring detection data; and
calculating a feature quantity of the detection data by using the feature quantity calculation equation and the second generation data calculation equations.

15. A non-transitory computer-readable storage medium storing instructions corresponding to a program for causing a computer to determine a solution to a target problem, comprising steps of:
acquiring a target problem;
generating a plurality of solution candidates to the target problem to solve the target problem;
generating a list including first generation data calculation equations;
determining a linear combination coefficient ($B_M$) based on the first generation data calculation equations;
determining a first standard deviation value ($StDev(X_M)$) and a second standard deviation value ($StDev(T_M)$);
determining a correlation coefficient value ($Correl(X_M, T_M)$);
calculating a contribution ratio (Ratio) of each solution candidate to the target problem if the target problem is solved using all the plurality of solution candidates, the calculation being performed by using the equation:

$$\text{Ratio} = \frac{B_M}{StDev(X_M)} \times St(Dev(T_M)) \times Correl(X_M, T_M); \text{ and}$$

generating an iterative solution candidate to the target problem in a next generation in accordance with a genetic algorithm that uses an evaluation value that is calculated using at least the contribution ratio of each solution candidate to the target problem.

16. A non-transitory recording medium storing the program of claim 15.

* * * * *